United States Patent
Harada et al.

(10) Patent No.: US 10,591,769 B2
(45) Date of Patent: Mar. 17, 2020

(54) DISPLAY DEVICE

(71) Applicant: Japan Display Inc., Tokyo (JP)

(72) Inventors: Tsutomu Harada, Tokyo (JP); Daichi Suzuki, Tokyo (JP); Kazuhiko Sako, Tokyo (JP); Naoyuki Takasaki, Tokyo (JP); Kazunari Tomizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/106,537

(22) Filed: Aug. 21, 2018

(65) Prior Publication Data

US 2019/0064559 A1 Feb. 28, 2019

(30) Foreign Application Priority Data

Aug. 23, 2017 (JP) ................... 2017-160353

(51) Int. Cl.
*G09G 3/36* (2006.01)
*G02F 1/13357* (2006.01)
(Continued)

(52) U.S. Cl.
CPC ......... *G02F 1/1336* (2013.01); *G02B 6/0013* (2013.01); *G02F 1/13471* (2013.01); *G09G 3/3406* (2013.01); *G09G 3/3607* (2013.01); *G09G 3/3648* (2013.01); *G09G 3/3677* (2013.01); *G02B 6/0086* (2013.01); *G02F 2001/133601* (2013.01); *G09G 2300/023* (2013.01); *G09G 2300/0819* (2013.01); *G09G 2320/0276* (2013.01);
(Continued)

(58) Field of Classification Search
CPC ............... G09G 3/36; G09G 5/00; F21V 7/04
See application file for complete search history.

(56) References Cited

U.S. PATENT DOCUMENTS 8,400,391 B2 * 3/2013 Schmidt ............... G09G 3/2081
345/102
2009/0303167 A1 * 12/2009 Mori .................... G09G 3/3426
345/89

(Continued)

FOREIGN PATENT DOCUMENTS

| JP | 2015-108818 A | 6/2015 |
|----|---------------|--------|
| JP | 2015-191053 A | 11/2015 |
| JP | 2016-110099 A | 6/2016 |

*Primary Examiner* — Pegeman Karimi
(74) *Attorney, Agent, or Firm* — K&L Gates LLP

(57) ABSTRACT

According to an aspect, a display device includes: a display panel including a display area provided with pixels; an illuminator including an illumination area configured to emit light to the display panel such that the display area is illuminated from one surface side of the display panel; and a liquid crystal dimming panel overlapping the display panel, and including a dimming area configured to be adjusted in transmittance of the light emitted to another surface side of the display panel through the display area. The illumination area includes first segment regions configured such that luminance levels thereof are individually adjusted. The dimming area includes second segment regions configured such that the light transmittances thereof are individually adjusted. Each of the first segment regions overlaps more than one of the second segment regions. Each of the second segment regions overlaps more than one of the pixels.

5 Claims, 16 Drawing Sheets

(51) Int. Cl.
*G09G 3/34* (2006.01)
*F21V 8/00* (2006.01)
*G02F 1/1347* (2006.01)
*G02F 1/1335* (2006.01)

(52) U.S. Cl.
CPC ............ *G09G 2320/0626* (2013.01); *G09G 2330/021* (2013.01); *G09G 2360/16* (2013.01)

(56) References Cited

U.S. PATENT DOCUMENTS

| | | | |
|---|---|---|---|
| 2010/0026703 A1* | 2/2010 | Parker | G02B 6/0046 345/589 |
| 2010/0103089 A1* | 4/2010 | Yoshida | G09G 3/2022 345/102 |
| 2011/0227940 A1* | 9/2011 | Neal | G09G 3/3426 345/589 |
| 2015/0109352 A1 | 4/2015 | Takasaki et al. | |
| 2015/0277026 A1* | 10/2015 | Choi | G02B 6/0055 362/606 |
| 2016/0155402 A1 | 6/2016 | Hoshino | |

\* cited by examiner

FIG.2
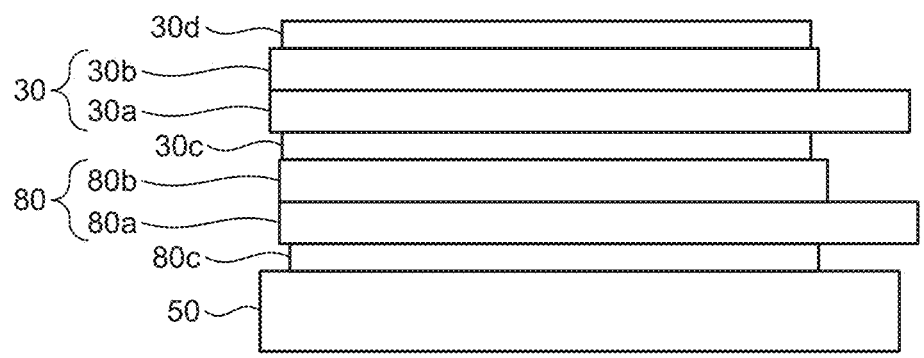
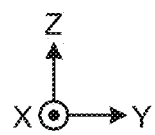
FIG.3
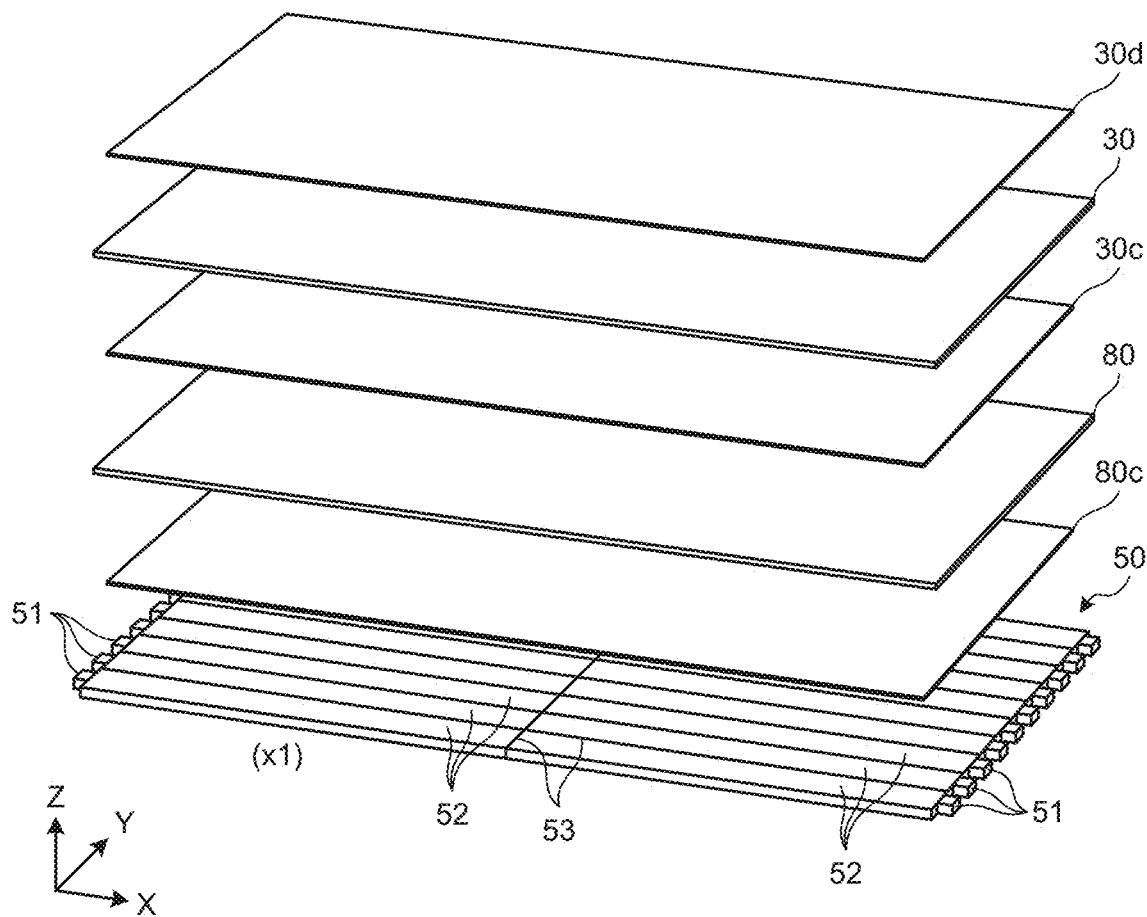

FIG.12
(DA)
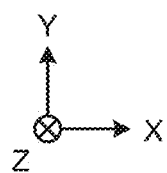

FIG.18
(LA2)
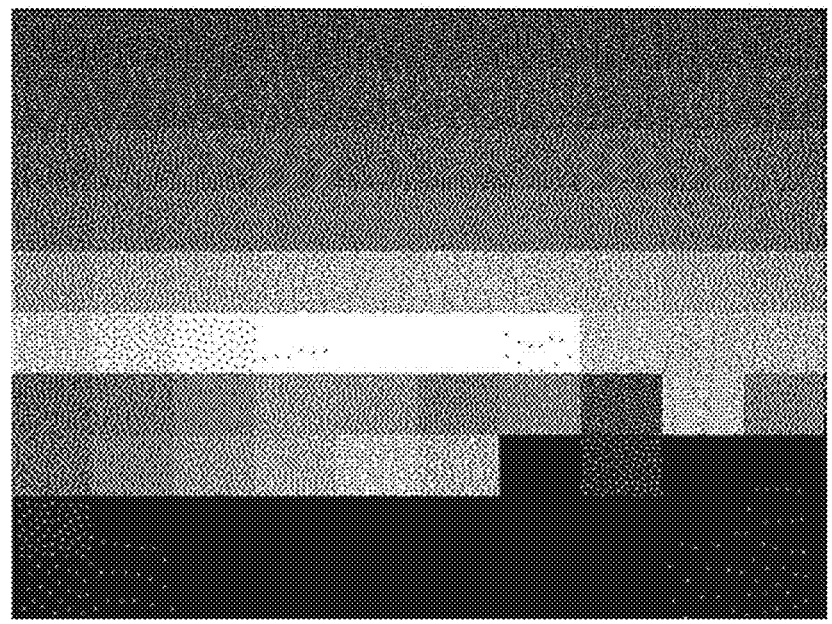
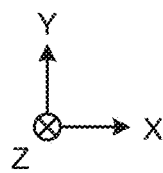
FIG.19
(DA)
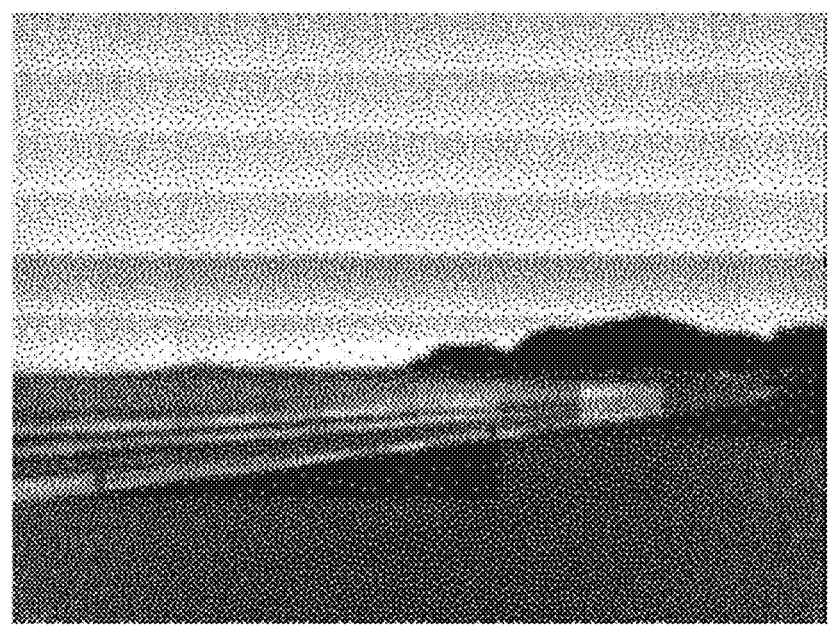
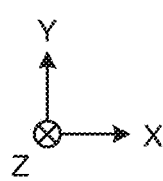

DISPLAY DEVICE

CROSS-REFERENCE TO RELATED APPLICATIONS

This application claims priority from Japanese Application No. 2017-160353, filed on Aug. 23, 2017, the contents of which are incorporated by reference herein in its entirety.

BACKGROUND

1. Technical Field

The present invention relates to a display device.

2. Description of the Related Art

As described in Japanese Patent Application Laid-open Publication No. 2015-191053, it is known that there are display devices illuminated by light from a back surface side thereof have a configuration in which an additional panel capable of controlling the transmittance of the light is provided between a display panel and a backlight.

However, in the conventional configuration, the overall backlight has uniform luminance, and the additional panel controls the quantity of light used for display output. This configuration causes the backlight to consume large power when an image output to be displayed has high luminance, even only in part. Thus, the power consumption is difficult to be reduced. In addition, when the luminance of the backlight is high, a sufficient contrast between a bright part a dark part of an image is difficult to be obtained by only reducing the transmittance using the additional panel.

For the foregoing reasons, there is a need for a display device capable of obtaining a high contrast with lower power consumption.

SUMMARY

According to an aspect, a display device includes: a display panel including a display area provided with a plurality of pixels; an illuminator including an illumination area configured to emit light to the display panel such that the display area is illuminated from one surface side of the display panel; and a liquid crystal dimming panel overlapping the display panel and including a dimming area configured to be adjusted in transmittance of the light emitted to another surface side of the display panel through the display area. The illumination area includes a plurality of first segment regions configured such that luminance levels thereof are individually adjusted. The dimming area includes a plurality of second segment regions configured such that the light transmittances thereof are individually adjusted. Each of the first segment regions overlaps more than one of the second segment regions. Each of the second segment regions overlaps more than one of the pixels.

BRIEF DESCRIPTION OF THE DRAWINGS

FIG. 2 is a diagram illustrating an exemplary positional relation of an image display panel, a dimming panel, and a light source device;

FIG. 3 is another diagram illustrating the exemplary positional relation of the image display panel, the dimming panel, and the light source device;

FIG. 12 is a diagram illustrating an exemplary state of the dimming area when the display output illustrated in FIG. 10 is produced;

FIG. 18 is a diagram illustrating a luminance distribution example of light emitted from the light source device illustrated in FIG. 17;

FIG. 19 is a diagram illustrating an exemplary state of the dimming area irradiated with light providing the luminance distribution illustrated in FIG. 18.

DETAILED DESCRIPTION

Figure 1:
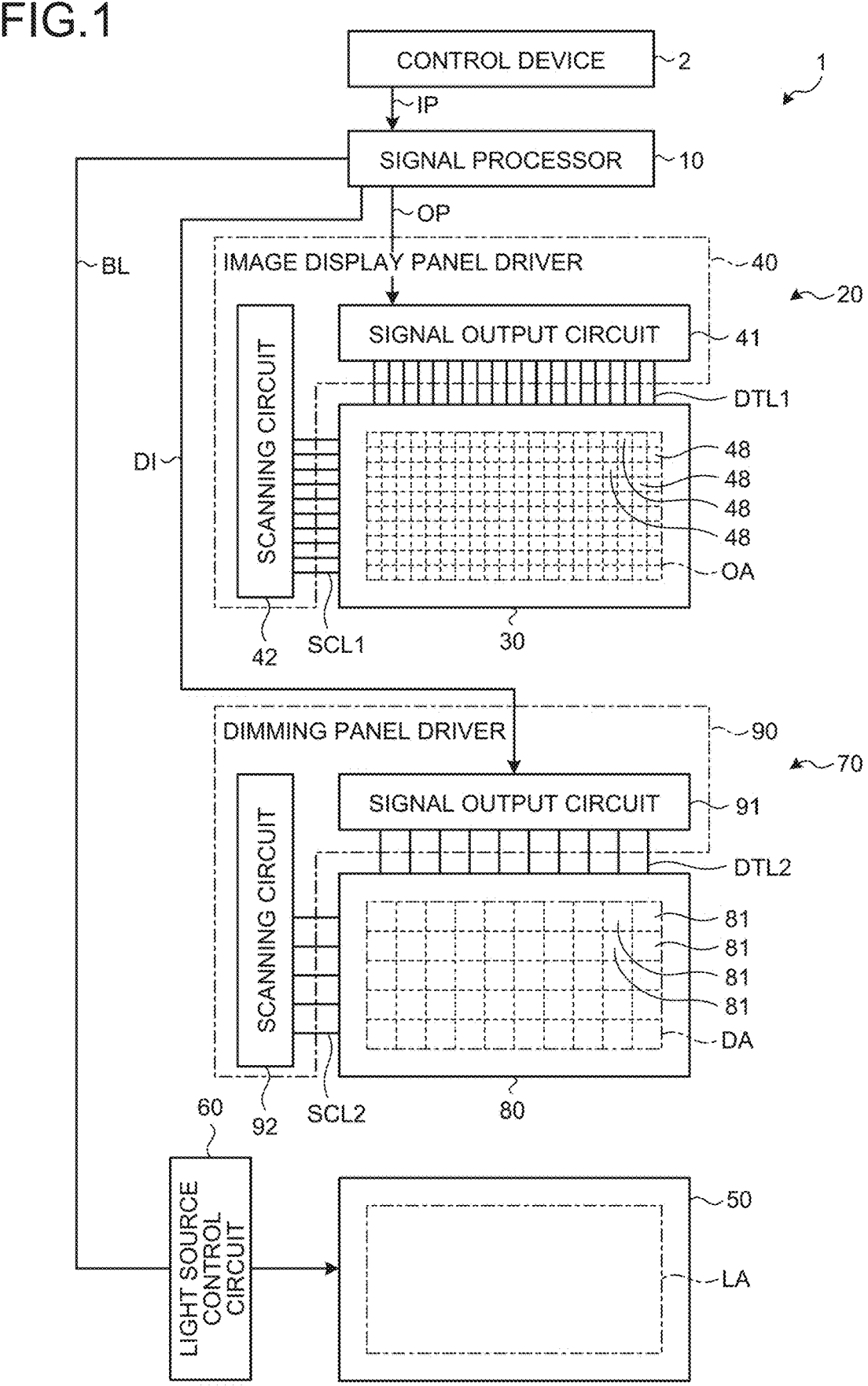
FIG. 1 is a diagram illustrating an exemplary main configuration of a display device according to an embodiment of the present invention.

The following describes an embodiment of the present invention with reference to the drawings. What is disclosed herein is merely an example, and the present invention naturally encompasses appropriate modifications easily conceivable by those skilled in the art while maintaining the gist of the invention. To further clarify the description, widths, thicknesses, shapes, and the like of various parts are schematically illustrated in the drawings as compared with actual aspects thereof, in some cases. However, they are merely examples, and interpretation of the present invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

FIG. 1 is a diagram illustrating an exemplary main configuration of a display device 1 according to an embodiment of the present invention. The display device 1 of this embodiment includes a signal processor 10, a display unit 20, a light source device 50, a light source control circuit 60, and a dimmer 70. The signal processor 10 performs various output operations based on input signals IP received from an external control device 2, and controls operations of the display unit 20, the light source device 50, and the dimmer 70. The input signals IP serve as data for displaying an image on the display device 1, and are, for example, red, green, and blue (RGB) image signals representing gradation values of pixels 48. Image data received by the display device 1 is a set of the input signals IP for the respective pixels 48 (to be described later). The signal processor 10 outputs, to the display unit 20, output signals OP generated based on the input signals IP. The signal processor 10 outputs, to the dimmer 70, local dimming signals DI generated based on the input signals IP. After receiving the input signals IP, the signal processor 10 outputs, to the light source control circuit 60, light source drive signals BL for controlling lighting amounts of respective light sources 51 included in the light source device 50. The light source control circuit 60 is, for example, a driver circuit for lighting up the light sources 51 included in the light source device 50, and operates the light source device 50 according to the light source drive signals BL.

The display unit 20 includes an image display panel 30 and an image display panel driver 40. The image display panel 30 includes a display area OA provided with the pixels 48. The pixels 48 are arranged, for example, in a matrix (row-column configuration). The image display panel 30 of this embodiment is a liquid crystal image display panel. The image display panel driver 40 includes a signal output circuit 41 and a scanning circuit 42. The signal output circuit 41 drives the pixels 48 based on the output signals OP. The scanning circuit 42 outputs a drive signal for scanning the pixels 48 arranged in a matrix on a per predetermined number of lines basis (such as on a per row basis). The pixels 48 are driven so as to output gradation values corresponding to the output image signals OP at the time when the drive signal is output.

The dimmer 70 adjusts the quantity of light emitted from the light source device 50 and output through the display area OA. The dimmer 70 includes a dimming panel 80 and a dimming panel driver 90. The dimming panel 80 includes a dimming area DA provided with a plurality of second segment regions 81. The dimming area DA is disposed in a position overlapping the display area OA when the display area OA is viewed in a plan view. The dimming area DA covers the entire display area OA in the plan view. The second segment regions 81 are provided such that the light transmittance of each second segment region 81 can be changed. The dimming panel driver 90 individually controls the transmittances of the second segment regions 81 in the dimming area DA according to the local dimming signals DI.

FIGS. 2 and 3 are diagrams illustrating an exemplary positional relation of the image display panel 30, the dimming panel 80, and the light source device 50. FIG. 3 individually illustrates schematic perspective views of layered components with spaces provided therebetween for the purpose of illustrating configuration examples of the components. In this embodiment, as illustrated in FIGS. 2 and 3, the image display panel 30, the dimming panel 80, and the light source device 50 are layered. That is, the dimming panel 80 is provided between the image display panel 30 and the light source device 50 (illuminator). Specifically, the dimming panel 80 is disposed on a light-emitting surface side of the light source device 50 from which the light is emitted. The image display panel 30 is disposed on a first side of the dimming panel 80, the first side being opposite to a second side of the dimming panel 80 on which the light source device 50 is disposed. The light emitted from an illumination area LA of the light source device 50 is adjusted in light quantity by the dimming area DA of the dimming panel 80, and illuminates the image display panel 30. The image display panel 30 is illuminated from one surface side (back surface side) thereof where the light source device 50 lies, and displays the image on the other surface side (display surface side) opposite to the one surface side. In this manner, the light source device 50 serves as an illuminator having the illumination area LA that emits light to the display area OA such that the display area OA is illuminated from one surface side of the image display panel 30. In this embodiment, the dimming panel 80 is provided between the image display panel 30 and the light source device 50. Hereinafter, a Z-direction refers to the direction in which the image display panel 30, the dimming panel 80, and the light source device 50 are layered. An X-direction and a Y-direction refer to two directions orthogonal to the Z-direction. The X-direction and the Y-direction are orthogonal to each other. The pixels 48 are arranged in a matrix (row-column configuration) along the X- and Y-directions. In this embodiment, the X-direction corresponds to the row direction, and the Y-direction corresponds to the column direction.

The image display panel 30 includes an array substrate 30a and a counter substrate 30b that is located on a display surface side of the array substrate 30a and faces the array substrate 30a. As will be described later, a liquid crystal layer LC1 is disposed between the array substrate 30a and the counter substrate 30b (refer to FIG. 5). A polarizing plate 30c is provided on a back surface side of the array substrate 30a. A polarizing plate 30d is provided on a display surface side of the counter substrate 30b. The dimming panel 80 includes a first substrate 80a and a second substrate 80b that is located on a display surface side of the first substrate 80a and faces the first substrate 80a. As will be described later, a liquid crystal layer LC2 is disposed between the first substrate 80a and the second substrate 80b. A polarizing plate 80c is provided on a back surface side of the first substrate 80a. The polarizing plate 30c polarizes light both on a back surface side of the image display panel 30 and on a display surface side of the dimming panel 80.

Figure 4:
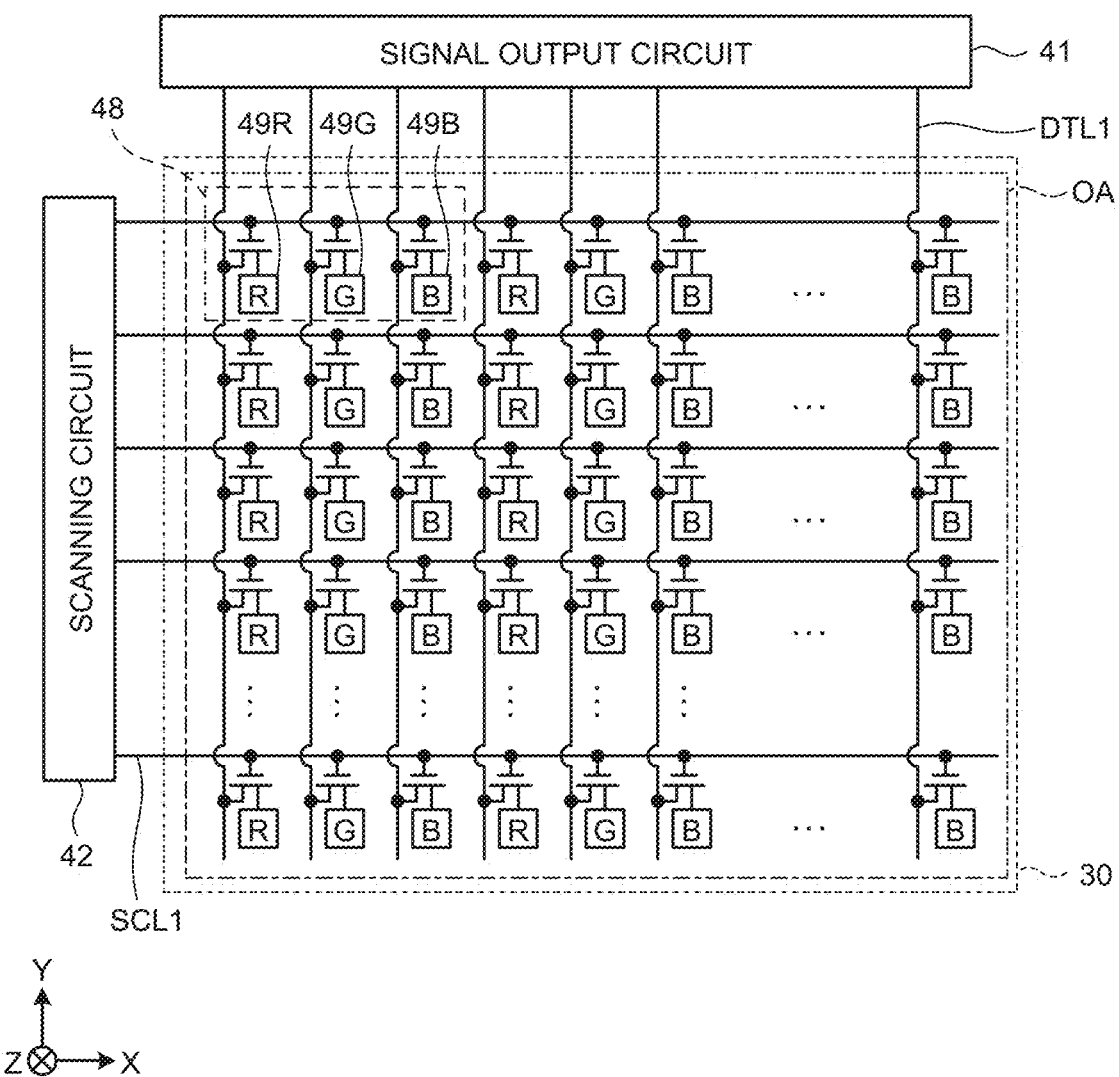
FIG. 4 is a diagram illustrating an exemplary pixel array of the image display panel.

FIG. 4 is a diagram illustrating an exemplary pixel array of the image display panel 30. As illustrated in FIG. 4, each of the pixels 48 includes, for example, a first sub-pixel 49R, a second sub-pixel 49G, and a third sub-pixel 49B. The first sub-pixel 49R displays a first primary color (for example, red). The second sub-pixel 49G displays a second primary color (for example, green). The third sub-pixel 49B displays a third primary color (for example, blue). In this manner, each of the pixels 48 arranged in a matrix (in a row-column configuration) in the image display panel 30 includes the first sub-pixel 49R that displays a first color, the second sub-pixel 49G that displays a second color, and the third sub-pixel 49B that displays a third color. The first color, the second color, and the third color are not limited to the first primary color, the second primary color, and the third primary color, but only need to be different colors from one another, such as complementary colors. In the following description, the first sub-pixel 49R, the second sub-pixel 49G, and the third sub-pixel 49B will be each called a sub-pixel 49 when not necessary to be distinguished from one another.

Each of the pixels 48 may further include a sub-pixel 49, in addition to the first sub-pixel 49R, the second sub-pixel 49G, and the third sub-pixel 49B. For example, the pixel 48 may include a fourth sub-pixel that displays a fourth color. The fourth sub-pixel displays a fourth color (for example, white). The fourth sub-pixel is preferably brighter than the first sub-pixel 49R that displays the first color, the second sub-pixel 49G that displays the second color, and the third sub-pixel 49B that displays the third color, when irradiated with the same light source lighting amount.

The display device 1 is more specifically a transmissive color liquid crystal display device. As illustrated in FIG. 4, the image display panel 30 is a color liquid crystal display panel, in which a first color filter for transmitting a light component in the first primary color is disposed between the first sub-pixel 49R and an image viewer, a second color filter for transmitting a light component in the second primary color is disposed between the second sub-pixel 49G and the image viewer, and a third color filter for transmitting a light component in the third primary color is disposed between the third sub-pixel 49B and the image viewer. A filter film 26 (to be described later) includes the first color filter, the second color filter, and the third color filter.

In the case where the fourth sub-pixel is provided, no color filter is disposed between the fourth sub-pixel and the image viewer. In this case, a transparent resin layer instead of the color filter may be provided for the fourth sub-pixel.

The signal output circuit 41 is electrically coupled to the image display panel 30 through signal lines DTL1. The image display panel driver 40 uses the scanning circuit 42 to select the sub-pixel 49 in the image display panel 30 and to control ON and OFF of a switching element (such as a thin-film transistor (TFT)) for controlling operations (light transmittance) of the sub-pixel 49. The scanning circuit 42 is electrically coupled to the image display panel 30 through scanning lines SCL1. In this embodiment, the scanning lines SCL1 extend along the X-direction, and the signal lines DTL1 extend along the Y-direction. These are, however, mere examples of extension directions of the scanning lines SCL1 and the signal lines DTL1. The extension directions are not limited thereto, and can be changed as appropriate.

Figure 5:
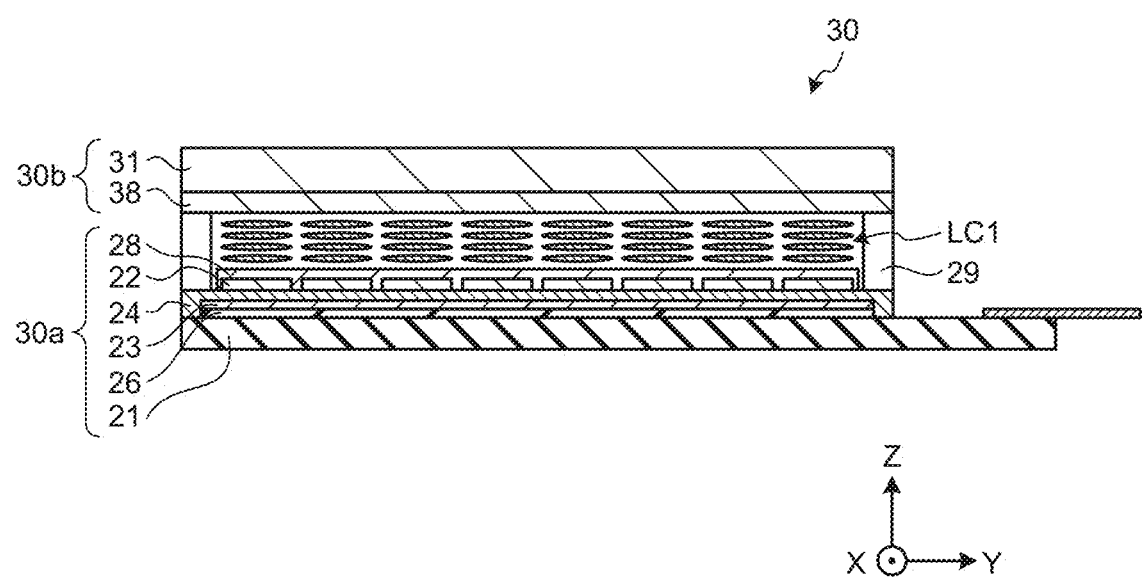
FIG. 5 is a schematic diagram illustrating an exemplary sectional structure of the image display panel.

FIG. 5 is a schematic diagram illustrating an exemplary sectional structure of the image display panel 30. The array substrate 30a includes the filter film 26, a counter electrode 23, an insulating film 24, pixel electrodes 22, and a first orientation film 28. The filter film 26 is provided on a pixel substrate 21, such as a glass substrate. The counter electrode 23 is provided on the filter film 26. The insulating film 24 is provided on the counter electrode 23 so as to be in contact therewith. The pixel electrodes 22 are provided on the insulating film 24. The first orientation film 28 is provided on the uppermost surface side of the array substrate 30a. The counter substrate 30b includes a counter pixel substrate 31, such as a glass substrate, and a second orientation film 38. The second orientation film 38 is provided on a lower surface of the counter pixel substrate 31. The array substrate 30a is fixed to the counter substrate 30b with a sealing part 29 interposed therebetween. The liquid crystal layer LC1 is sealed in a space surrounded by the array substrate 30a, the counter substrate 30b, and the sealing part 29. The liquid crystal layer LC1 contains liquid crystal molecules that change in orientation direction according to an electric field applied thereto. The liquid crystal layer LC1 modulates light passing through the liquid crystal layer LC1 according to the state of the electric field. The electric field applied between the pixel electrodes 22 and the counter electrode 23 changes the orientations of the liquid crystal molecules of the liquid crystal layer LC1, and thus changes the transmission amount of the light passing through the liquid crystal layer LC1. The sub-pixels 49 each include the pixel electrode 22. The switching elements for individually controlling the operations (light transmittances) of the sub-pixels 49 are electrically coupled to the pixel electrodes 22.

The voltages of the signals transmitted through the signal lines DTL1 correspond to the gradation values represented by the output signals OP. The sub-pixels 49 included in the pixels 48 change the orientations of the liquid crystal molecules of the liquid crystal layer LC1 so as to transmit light at transmittance corresponding to the voltages of the signals transmitted through the signal lines DTL1.

Figure 6:
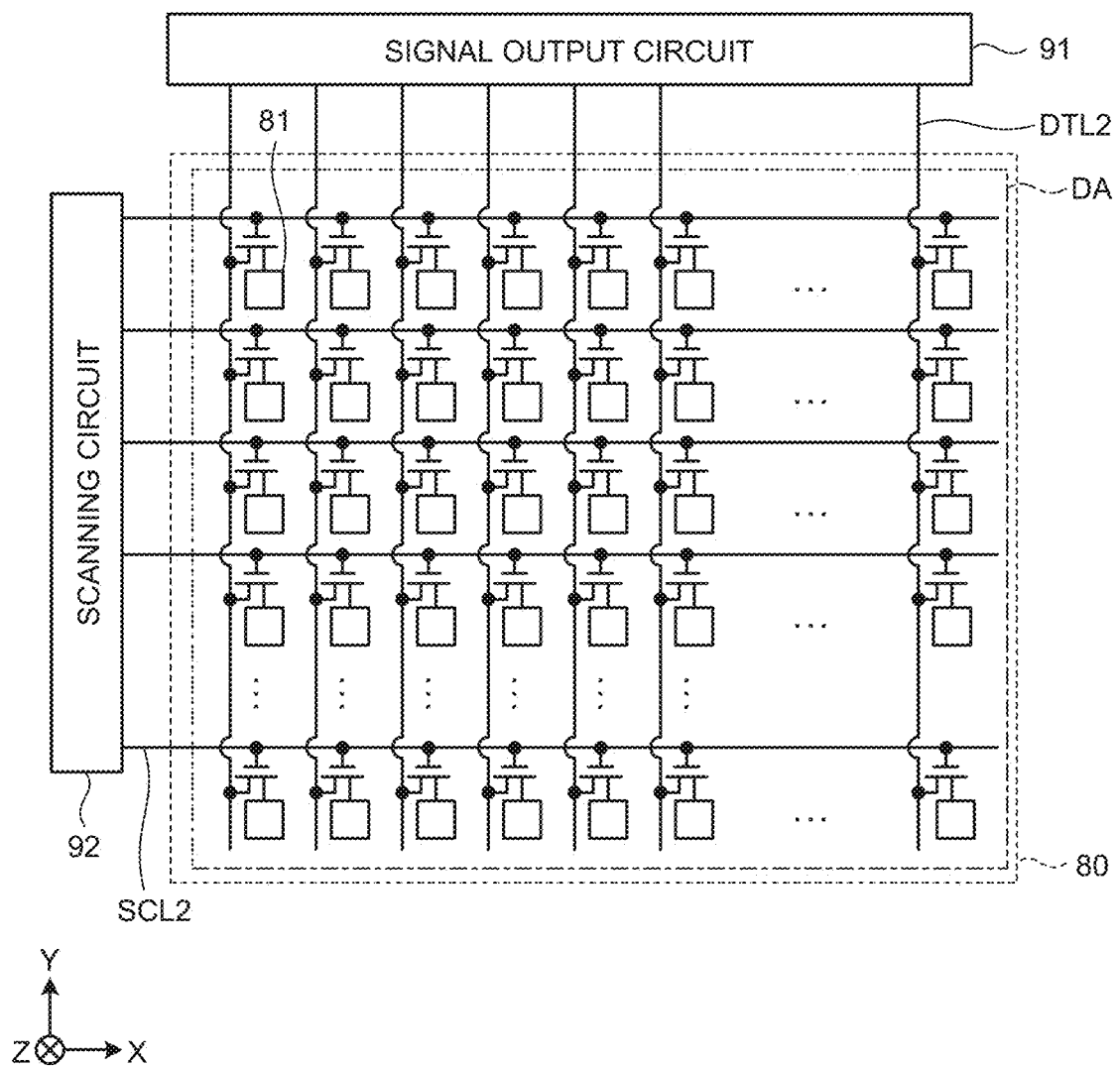
FIG. 6 is a diagram illustrating an exemplary array of dimming area included in the dimming panel.

FIG. 6 is a diagram illustrating an exemplary array of the second segment regions 81 included in the dimming panel 80. As illustrated in FIG. 6, the dimming panel 80 includes the second segment regions 81 provided in a matrix (row-column configuration). The second segment regions 81 have the same configuration as that of the sub-pixels 49, except that the color filters are not disposed unlike the sub-pixels 49, and that the number of the second segment regions 81 differs from that of the sub-pixels 49. That is, the second segment regions 81 change orientations of liquid crystal molecules of the liquid crystal layer sealed between the first substrate 80a and the second substrate 80b of the dimming panel 80 so as to transmit light at transmittance corresponding to voltages of signals transmitted through signal lines DTL2. With this configuration, the second segment regions 81 are configured such that the light transmittance of each second segment region 81 can individually be changed. In this manner, the dimming area DA includes the second segment regions 81 configured such that the light transmittance of each second segment region 81 can be individually adjusted.

The dimming panel driver 90 includes a signal output circuit 91 and a scanning circuit 92. The signal output circuit 91 is coupled to the second segment regions 81 arranged in the Y-direction, through the signal lines DTL2. The scanning circuit 92 is coupled to the second segment regions 81 arranged in the X-direction, through scanning lines SCL2. The signal output circuit 91 individually controls the transmittance of each of the second segment regions 81 by driving the second segment regions 81 according to the local dimming signals DI. The voltages of the signals transmitted from the signal output circuit 91 to the second segment regions 81 through the signal lines DTL2 correspond to the transmittance represented by the local dimming signals DI. The scanning circuit 92 outputs a drive signal for scanning the second segment regions 81 arranged in a matrix on a per predetermined number of lines basis (such as on a per row basis). The second segment regions 81 are driven so as to have the transmittance corresponding to the local dimming signals DI at the time when the drive signal is output.

The dimming panel 80 may have, as a more specific configuration, for example, the same configuration as that of the image display panel 30 illustrated in FIG. 5. However, since the second segment regions 81 have no color filter, the dimming panel 80 has, for example, a configuration obtained by removing the filter layer 26 from the configuration described with reference to FIG. 5. By having the configuration with no color filter, the dimming panel 80 can obtain higher light transmittance. The dimming panel 80 may have other specific configurations. For example, a liquid crystal panel of another type, such as a twisted nematic (TN) liquid crystal panel, may be provided as the dimming panel 80.

The number of the second segment regions 81 is smaller than the number of the pixels 48. Specifically, the number of the pixels 48 is n times the number of the second segment regions 81, where n is a natural number of two or greater. For example, the number of the second segment regions 81 is 2073600 calculated by 1920×1080 where 1920 is the number thereof in X-direction and 1080 is the number thereof in Y-direction. The number of the pixels 48 is 33177600 calculated by 7680×4320 where 7680 is the number thereof in X-direction and 4320 is the number thereof in Y-direction. In this example, the number of the pixels 48 is four times greater in the X-direction, four times greater in the Y-direction, and 16 times greater in total than the number of the second segment regions 81.

The number of the sub-pixels 49 corresponds to the number of the pixels 48. When each of the pixels 48 includes the first sub-pixel 49R, the second sub-pixel 49G, and the third sub-pixel 49B as in this embodiment, the number of the sub-pixels 49 is three times the number of the pixels 48. These exemplified numbers of the second segment regions 81, the pixels 48, and the sub-pixels 49 are merely examples, and are not limited thereto and can be changed as appropriate.

Figure 7:
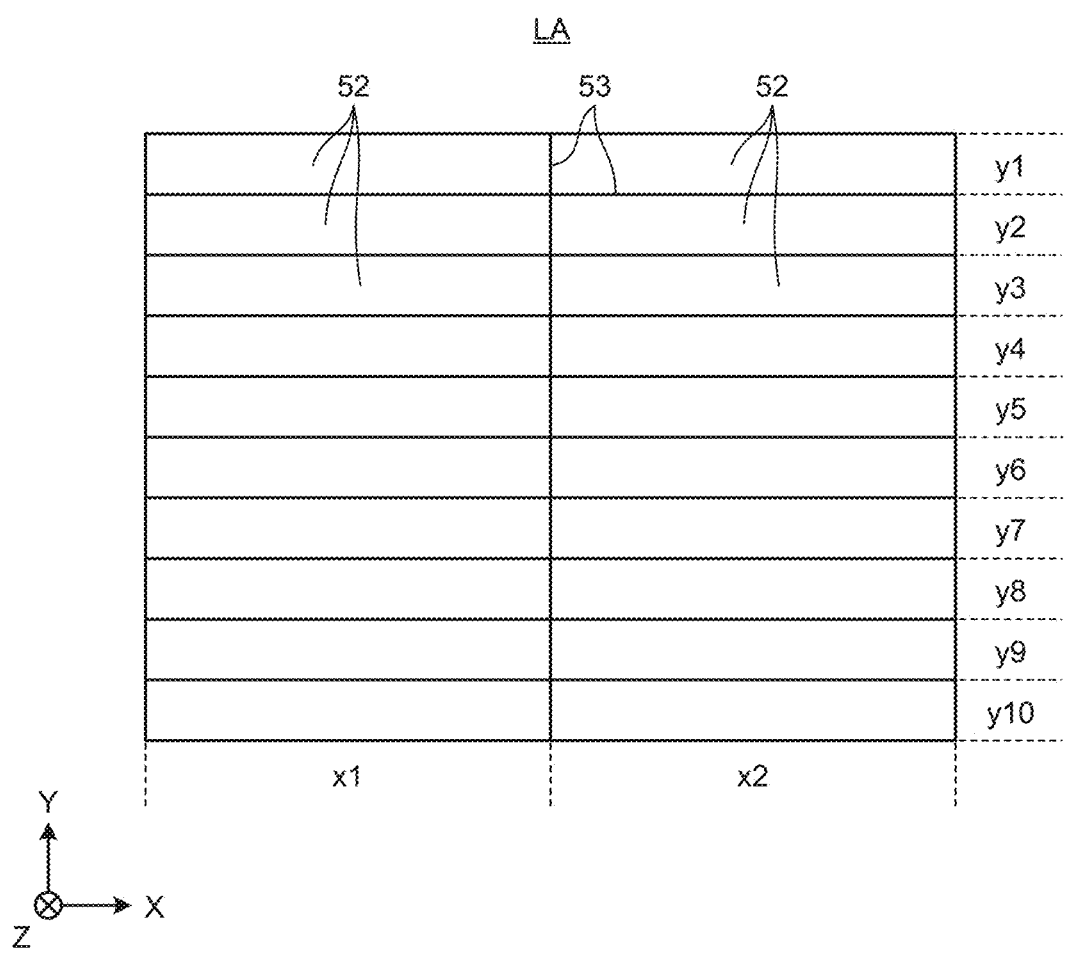
FIG. 7 is a diagram illustrating a configuration example of light guide plates included in the light source device.

FIG. 7 is a diagram illustrating a configuration example of light guide plates 52 included in the light source device 50. The light source device 50 includes, for example, the light sources 51 and light guide plates 52. The light sources 51 are, for example, light-emitting diodes (LEDs) for emitting white light, but are not limited thereto, and can be changed as appropriate. The light sources 51 are provided as "side lights" on one side surface side of the light guide plates 52, as illustrated, for example, in FIG. 3. The light guide plates 52 guide the light emitted from the light sources 51 such that the light travels from the light source device 50 to the display surface side. Specifically, each of the light guide plates 52 includes, for example, a base that is a colorless translucent plate-like resin member and a reflective sheet that is attached on a back surface side of the base and reflects light. When irradiated with the light from the light sources 51 provided on one side surface side of the bases, the light guide plates 52 reflect the light at the reflective sheets and guide the light to the display surface side. In this embodiment, the light sources 51 are provided along both sides extending in the Y-direction of the light source device 50.

The light source device 50 of this embodiment includes the light guide plates 52. For example, as illustrated in FIG. 7, the number of the light guide plates 52 included in the light source device 50 is 20 calculated by 2×10 where 2 is the number thereof in X-direction and 10 is the number thereof in Y-direction. The light guide plates 52 individually guide the light from the respective light sources 51. The light sources 51 are provided corresponding to the light guide plates 52, and configured such that the lighting amounts thereof can be individually controlled. That is, the light source device 50 of this embodiment is provided such that the quantity of light from each of the light guide plates 52 is individually controlled.

Hereinafter, "first segment regions" refer to regions illuminated by light guided by the light guide plates 52 (or two or more parts included in a light guide plate obtained by dividing the light guide plate into the two or more parts by grooves), respectively. To distinguish positions of the light guide plates 52 and the first segment regions, the positions thereof are represented in some cases using coordinates x1 and x2 in the X-direction and coordinates y1, y2, . . . , and y10 in the Y-direction given in FIG. 7. For example, an expression (x1,y1) represents the position of a light guide plate 52 (or first segment region) at the upper left corresponding to both the coordinate x1 in the X-direction and the coordinate y1 in the Y-direction in FIG. 7. An expression (xm,yr) represents a position corresponding to any coordinates included in the coordinates x1 and x2 in the X-direction and the coordinates y1, y2, . . . , and y10 in the Y-direction ($1 \leq m \leq 2$ and $1 \leq r \leq 10$, where m and r are natural numbers).

In this embodiment, the light guide plates 52 are individually provided in the positions represented by the coordinates x1 and x2 in the X-direction and the coordinates y1, y2, . . . , and y10 in the Y-direction, and these light guide plates 52 are bonded with a resin 53 having no translucency. As described above, the light source device 50 of this embodiment projects the light of the light sources 51 toward the display surface side from respective parts of the illumination area LA provided with the light guide plates 52. This configuration is merely an example of the specific configuration of the illumination area LA, and the configuration thereof can be changed as appropriate. For example, grooves may be formed on a continuous light guide plate covering the entire illumination area LA, and the grooves may divide the light guide plate into a plurality of blocks corresponding to the coordinates.

The number of the light sources 51 corresponds to the number of the first segment regions provided in the illumination area LA. Each of the first segment regions only needs to include one or more of the light sources 51 configured such that the lighting amounts thereof can be individually controlled. For example, in the example illustrated in FIG. 3, each of the light guide plates 52 is provided with one light source 51. Each of the light guide plates 52 may, however, be provided with two or more light sources 51. As described above, in this embodiment, the illumination area LA includes the first segment regions configured such that the luminance levels thereof can be individually adjusted. Each of the first segment regions is provided with the light source 51, and the lighting amounts of the light sources 51 for the different first segment regions are individually determined.

Figure 8:
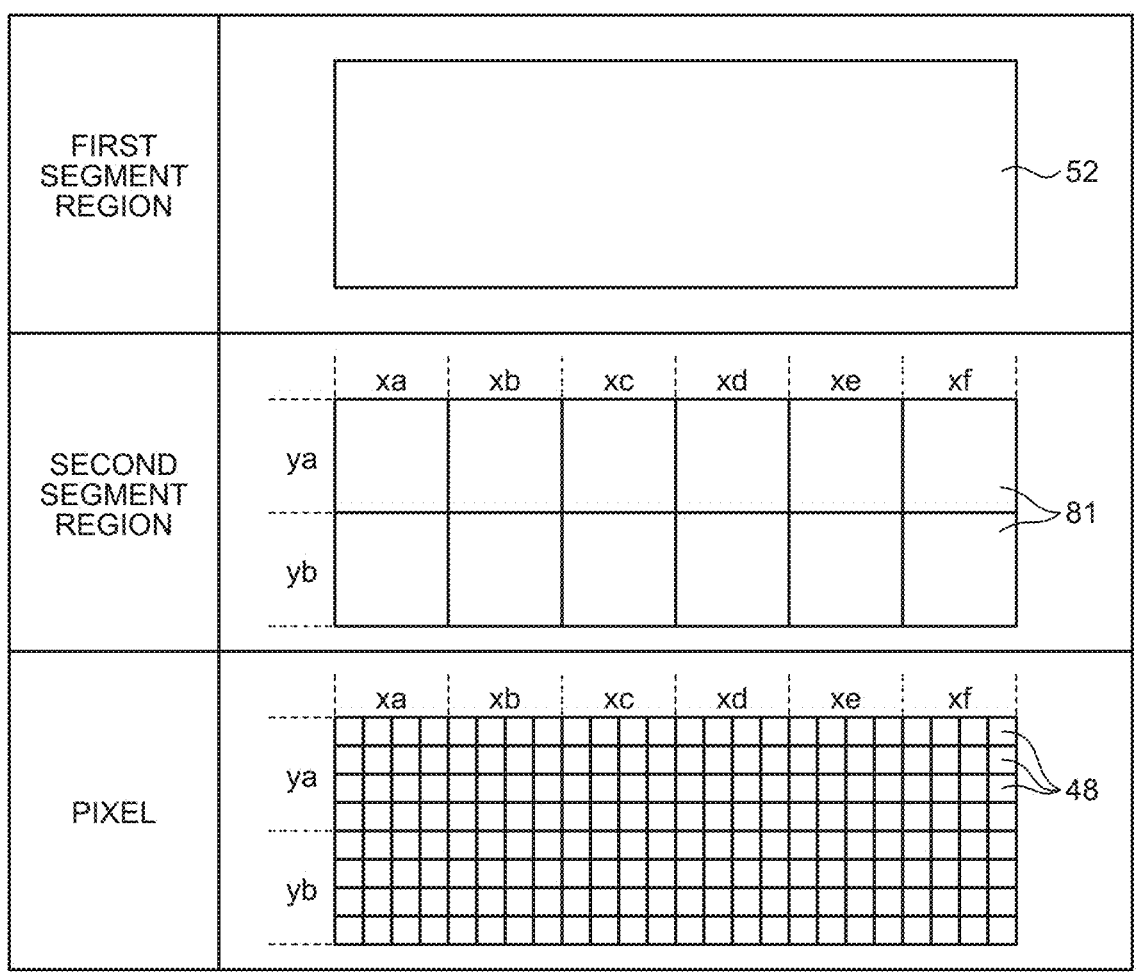
FIG. 8 is a schematic diagram illustrating a relation between one of the light guide plates, a dimming area irradiated with light from the light guide plate, and pixels irradiated with the light passing through the dimming area.

FIG. 8 is a schematic diagram illustrating a relation between one of the light guide plates 52, the dimming area DA irradiated with the light from the light guide plate 52, and the pixels 48 irradiated with the light passing through the dimming area DA. In this embodiment, each of the first segment regions overlaps more than one of the second segment regions 81, and each of the second segment regions 81 overlaps more than one of the pixels 48. Specifically, the light source device 50, the dimming panel 80, and the image display panel 30 are layered, and as a result, the first segment regions, the second segment regions 81, and the pixels 48 overlap in the plan view. Specifically, as illustrated in FIG. 8, each of the first segment regions overlaps more than one of the second segment regions 81. Each of the second segment regions 81 overlaps more than one of the pixels 48. The first segment region illustrated in FIG. 8 is the first segment region at (xm,yr).

In FIG. 8, the number of the second segment regions 81 overlapping one of the first segment regions is 12. In FIG. 8, the number of the pixels 48 overlapping one of the second segment regions 81 is 16. This is merely a schematic example for more simply explaining this embodiment, which is not limited to this example. For example, when the number of the first segment regions is 20 calculated by 2×10 where 2 is the number thereof in X-direction and 10 is the number thereof in Y-direction, and the number of the second segment regions 81 is 2073600 calculated by 1920×1080 where 1920 is the number thereof in X-direction and 1080 is the number thereof in Y-direction, the number of the second segment regions 81 overlapping one of the first segment regions is 103680 calculated by 960×108 where 960 is the number thereof in X-direction and 108 is the number thereof in Y-direction. To distinguish positional relations of the second segment regions 81 with the pixels 48 overlapping one of the first segment regions, the positions of the second segment regions 81 and the pixels 48 are represented in some cases using coordinates xa and xb in the X-direction and coordinates ya, yb, . . . , and yf in the Y-direction given in FIG. 8.

Figure 9:
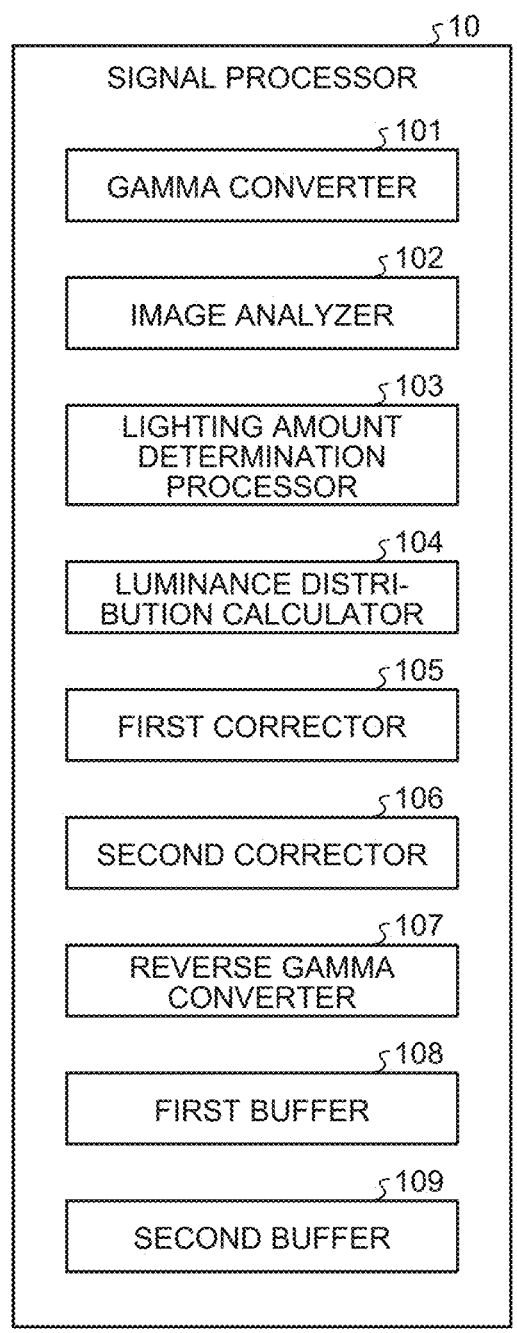
FIG. 9 is a block diagram illustrating main functions included in a signal processor.

FIG. 9 is a block diagram illustrating main functions included in the signal processor 10. The signal processor 10 is a circuit including, for example, a gamma converter 101, an image analyzer 102, a lighting amount determination processor 103, a luminance distribution calculator 104, a first corrector 105, a second corrector 106, a reverse gamma converter 107, a first buffer 108, and a second buffer 109.

The gamma converter 101 performs gamma conversion on an input image. Specifically, the signal processor 10 keeps data representing a correspondence relation between the RGB image signals (gradation values) before and after the gamma conversion. The gamma converter 101 performs the gamma conversion on the input signals IP.

The image analyzer 102 analyzes the image data represented by the input signals IP after being subjected to the gamma conversion. Specifically, the image analyzer 102 segments the image data into a plurality of pieces of segmented image data, and handles the pieces of segmented image data as a plurality of pieces of partial data (first partial data) for the respective first segment regions (first segmentation). The image analyzer 102 identifies gradation values that require, for example, the highest luminance in each piece of the first partial data. The image analyzer 102 uses the highest luminance value, and thus sufficient luminance corresponding to the highest luminance can be ensured in, for example, determining the lighting amounts of the light sources 51 (to be described later). As a result, an output image closer to the image (input image) based on the input signals IP can be obtained. The image analyzer 102 may apply a smoothing filter to the input image, and then use the highest gradation value in each piece of the first partial data. The case can reduce an influence of a value of a high luminance pixel, such as an isolated bright point or noise, having little effect on display quality. As a result, the overall power consumption can be reduced. Instead of using the smoothing filter, a histogram analysis can be performed to reduce the highest gradation value as far as having little effect on the display quality. In other words, the output of the image analyzer 102 can be selected depending on whether to display the image closer to the input image, or to perform the control with a higher priority on the power.

As a specific example, assume a case where the number of the first segment regions is 20 calculated by 2×10 where 2 is the number thereof in X-direction and 10 is the number thereof in Y-direction, the number of the second segment regions 81 is 2073600 calculated by 1920×1080 where 1920 is the number thereof in X-direction and 1080 is the number thereof in Y-direction, and the number of the pixels 48 is 33177600 calculated by 7680×4320 where 7680 is the number thereof in X-direction and 4320 is the number thereof in Y-direction. In this case, as the first segmentation, the image analyzer 102 segments the image data such that each of the first segment regions includes the input signals IP corresponding to 1658880 (=3840×432) pixels 48 where 3840 is the number thereof in X-direction and 432 is the number thereof in Y-direction. In the first segmentation, each piece of the first partial data is constituted by the input signals IP after being subjected to the gamma conversion corresponding to the pixels 48 overlapping a corresponding one of the first segment regions in the plan view. The image analyzer 102 performs first identification processing on each piece of the first partial data. In the first identification processing, the image analyzer 102 identifies the highest gradation value from among R, G, and B gradation values represented by the input signals IP included in one piece of the first partial data. In this manner, the image analyzer 102 serves as a first identification processor that identifies the highest gradation value from among the gradation values represented by the input signals IP for four or more pixels 48 overlapping one of the first segment regions.

The lighting amount determination processor 103 determines the lighting amount of the light source 51 corresponding to the luminance required for each of the first segment regions. Specifically, the lighting amount determination processor 103 obtains the luminance of each first segment region required for obtaining the highest gradation value in the first segment region identified by the first identification processing. For example, when the input signals IP represent 8-bit R, G, and B gradation values (from 0 to 255), the display output of the pixels 48 in the first segment region where the highest gradation value is identified to be the minimum (0) by the first identification processing corresponds to black ((R,G,B)=(0,0,0)). In this case, the first segment region does not need light from the light source 51. Therefore, the lighting amount determination processor 103 sets the lighting amount of the light source 51 provided for the light guide plate 52 serving as the first segment region to 0 [%] so as not to light up the light source 51. In contrast, in any of the first segment regions where the highest gradation value is not identified to be the minimum by the first identification processing, the luminance corresponding to the highest gradation value is required within the range of assumed luminance in the first segment region. Therefore, the lighting amount determination processor 103 determines, according to the highest gradation value, the lighting amount of the light source 51 provided for the light guide plate 52 serving as the first segment region, and lights up the light source 51. The lighting amount determination processor 103 individually determines the lighting amounts of the light sources 51. In this manner, the lighting amount determination processor 103 serves as a determination processor that performs the processing to determine the luminance of each of the first segment regions based on the highest gradation value of the gradation values represented by the input signals IP for four or more of the pixels 48 overlapping the first segment region. The lighting amount determination processor 103 outputs signals representing the lighting amounts of the light sources 51 determined by the lighting amount determination processor 103, as the light source drive signals BL to the light source control circuit 60. The following description will be given with reference to examples of FIGS. 10 and 11.

Figure 10:
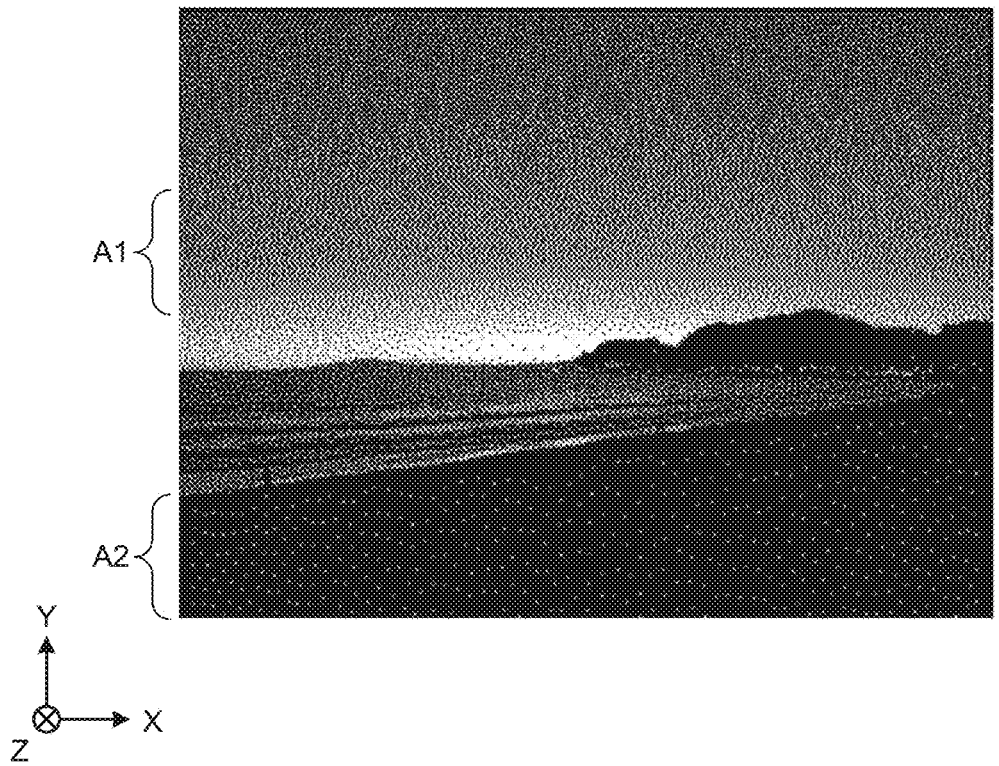
FIG. 10 is a diagram illustrating an exemplary display output by the display device.

FIG. 10 is a diagram illustrating an exemplary display output by the display device. Although illustrated in black and white in FIG. 10, the exemplary display output is actually a color output performed by the image display panel 30. For example, an image illustrated in FIG. 10 is output in the display area OA based on the input signals IP.

The image illustrated in FIG. 10 is an image in which a first portion A1 is brighter than a second portion A2 in the Y-direction. A portion brighter than the first portion A1 is present between the first portion A1 and the second portion A2. Such differences in brightness in the display output appear as differences in the highest gradation value between the first segment regions and between the second segment regions 81 obtained through the first segmentation and second segmentation by the image analyzer 102.

Figure 11:
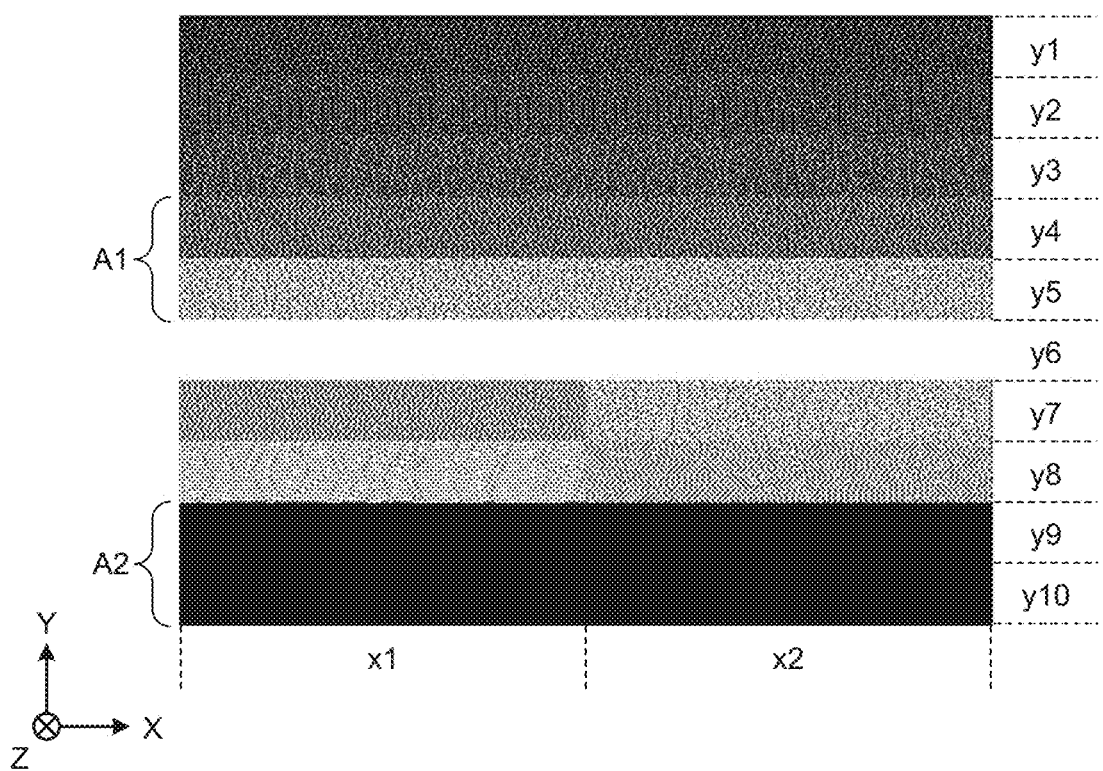
FIG. 11 is a diagram illustrating an example of luminance of an illumination area when the display output illustrated in FIG. 10 is produced.

FIG. 11 is a diagram illustrating an example of the luminance of the illumination area LA when the display output illustrated in FIG. 10 is produced. In FIG. 11, the brightness is closer to white as the luminance is higher, and closer to black as the luminance is lower. The input signals IP corresponding to the image illustrated in FIG. 10 are subjected to the gamma conversion, and then analyzed by the image analyzer 102. As a result, the highest gradation value is identified for each of the first segment regions and for each of the second segment regions 81. The lighting amount determination processor 103 determines the lighting amount of each of the light sources 51 according to the highest gradation value for each of the first segment regions. As a result, the luminance illustrated in FIG. 11 is obtained. In FIG. 11, the luminance levels of first segment regions at (x1,y4), (x2,y4), (x1,y5), and (x2,y5) are higher than the luminance levels of first segment regions at (x1,y9), (x2,y9), (x1,y10), and (x2,y10). This is because the first segment regions at (x1,y4), (x2,y4), (x1,y5), and (x2,y5) overlap the first portion A1 in the plan view, and the first segment regions at (x1,y9), (x2,y9), (x1,y10), and (x2,y10) overlap the second portion A2 in the plan view. The luminance levels of first segment regions at (x1,y6) and (x2,y6) overlapping the portion between the first portion A1 and the second portion A2 in FIG. 10 brighter than the first portion A1 are higher than the luminance levels of the first segment regions at (x1,y4), (x2,y4), (x1,y5), and (x2,y5).

The relation between the highest gradation value identified by the first identification processing and the lighting amount of the light source 51 according to the highest gradation value has been obtained, for example, based on measurement or the like performed in advance, and represented as reference data. The signal processor 10 of this embodiment keeps the reference data. The lighting amount determination processor 103 determines the lighting amount of the light source 51 based on the reference data.

The luminance distribution calculator 104 obtains a luminance distribution of the image data represented by the input signals IP after being subjected to the gamma conversion. Specifically, the luminance distribution calculator 104 segments the image data into a plurality of pieces of segmented image data corresponding to the second segment regions 81, and handles the pieces of segmented image data as a plurality of pieces of partial data (second partial data) for the respective second segment regions 81 (second segmentation). The luminance distribution calculator 104 identifies gradation values that require the highest luminance in each piece of the second partial data. As a specific example, the luminance distribution calculator 104 segments the image data such that each of the second segment regions 81 includes the input signals IP corresponding to 16 (=4×4) pixels 48 where the former 4 is the number thereof in X-direction and the latter 4 is the number thereof in Y-direction, as the second segmentation. In the second segmentation, each piece of the second partial data is constituted by the input signals IP after being subjected to the gamma conversion corresponding to the pixels 48 overlapping a corresponding one of the second segment regions 81 in the plan view. The luminance distribution calculator 104 performs second identification processing on each piece of the second partial data. In the second identification processing, the luminance distribution calculator 104 identifies the highest gradation value from among R, G, and B gradation values represented by the input signals IP included in one piece of the second partial data. In this manner, the luminance distribution calculator 104 serves as a second identification processor that identifies the highest gradation value from among the gradation values represented by the input signals IP for the pixels 48 overlapping one of the second segment regions 81. The luminance distribution calculator 104 may use the result of the analysis by the image analyzer 102.

The first corrector 105 performs processing for correcting the quantity of light emitted from the light source device 50 to the image display penal 30 using the dimming panel 80. Specifically, the first corrector 105 determines the transmittance of each of the second segment regions 81 based on the luminance of the first segment region and the gradation values represented by the input signals IP (highest gradation value for the second segment region 81 identified by the second identification processing). Based on this determination, the first corrector 105 determines the amount of correction of the light quantity by the dimming panel 80.

FIG. 12 is a diagram illustrating an exemplary state of the dimming area DA when the display output illustrated in FIG. 10 is produced. For example, assume a case where the degradation values are 8-bit values, and the luminance of the first segment region illustrated in FIG. 8 is 100 [%]. This is a case where the highest gradation value in the first segment region has been identified to be 255 by the first identification processing. The following describes the determination of the transmittance of one of the second segment regions 81 (such as one of the second segment regions 81 at coordinates (xa,ya) in FIG. 8) overlapping the first segment region in this case. The second identification processing has identified the highest gradation value from among the gradation values represented by the input signals IP corresponding to more than one of the pixels 48 (such as the 16 pixels 48 included in the coordinates (xa,ya) in FIG. 8) overlapping such one of the second segment regions 81. When the second identification processing has identified that the highest gradation value of the gradation values represented by the input signals IP is 255, luminance corresponding to the highest gradation value is required in order to cause the sub-pixels 49 included in the pixels 48 to produce a display output corresponding to the highest gradation value. Accordingly, the first corrector 105 sets the transmittance of the second segment region 81 to the maximum (100 [%]). When, instead, the second identification processing has identified that the highest gradation value of the gradation values represented by the input signals IP is 50 [%] of the maximum value representable by 8 bits (such as 127), the first corrector 105 sets the transmittance of the second segment region 81 to transmittance corresponding to the highest gradation value (such as 50 [%]).

Next, assume a case where the highest gradation value of the image to be displayed on the display area OA is half of the maximum gradation value. In this case, the luminance of the first segment region illustrated in FIG. 8 is 50 [%]. When the gradation value in the first segment region identified by the first identification processing is represented by 8 bits, the gradation value corresponds to half (such as 127) of the maximum gradation value. The following describes the determination of the transmittance of one of the second segment regions 81 in this case. Assume a case where, among the gradation values represented by the input signals IP corresponding to the pixels 48 included in a position at the same coordinates as those of such one of the second segment regions 81, the highest gradation value has been identified to be 127. In this case, the luminance of the first segment region is luminance corresponding to half the maximum value represented by 8 bits (such as 127). Therefore, the second segment region 81 needs to transmit light having the luminance to the maximum extent. Accordingly, the first corrector 105 sets the transmittance of the second segment region 81 to the maximum (100 [%]). Assume another case where the second identification processing has identified that the highest gradation value of the gradation values represented by the input signals IP is 25 [%] of the maximum value representable by 8 bits (such as 63). In other words, assume a case where a highest gradation value to be displayed in a region corresponding to the one second segment region 81 in the display area OA is 25 [%] of the maximum value represented by 8 bits. In this case, as the luminance of the first segment region is 50 [%] of the maximum luminance, the transmittance of the one second segment region 81 is set to 50 [%] such that the display output in the region of the display area OA corresponding to the one second segment region 81 is performed at luminance of 25 [%] of the maximum value represented by 8 bits. In this case, the ratio between the highest gradation value (25 [%]) identified by the second identification processing and the luminance (≅[%]) of the first segment region is 1:2. Accordingly, a value of 0.5 (50 [%]) is obtained by dividing the highest gradation value (≅[%]) identified by the second identification processing by the luminance (50 [%]) of the first segment region. The first corrector 105 sets the transmittance of the second segment region 81 to a value corresponding to the ratio between the highest gradation value (25 [%]) identified by the second identification processing and the luminance (50 [%]) of the first segment region that is calculated in this manner. In other words, the first corrector 105 sets the transmittance of the second segment region 81 to 50 [%]. The luminance of the first segment region and each of the highest gradation values (each of the highest gradation values identified by the first identification processing and the second identification processing) exemplified in the description above are merely examples, and are not limited thereto. The first corrector 105 determines the transmittance of the second segment region 81 to be transmittance corresponding to the luminance of the first segment region overlapping the second segment region 81 and to the highest gradation value of the gradation values of the input signals IP corresponding to the pixels 48 overlapping the second segment region 81.

Assume also a case where the luminance of the first segment region illustrated in FIG. 8 is 0 [%]. This is a case where the highest gradation value in the first segment region has been identified to be 0 by the first identification processing. In other words, this is a case where the display output of the first segment region corresponds to black ((R,G,B)=(0,0,0)). In this case, the first corrector 105 sets the transmittance of the second segment region 81 overlapping the first segment region to predetermined transmittance (such as 0 [%]).

The above description has exemplified the determination of the transmittance of one of the second segment regions 81 overlapping one of the first segment regions. The first corrector 105 also performs the same processing on the other second segment regions 81 overlapping the first segment region (such as the second segment regions 81 at coordinates other than the coordinates (xa,ya) in FIG. 8). The first corrector 105 performs the same processing not only on the second segment regions 81 overlapping one of the first segment regions, but also on the second segment regions 81 overlapping each of the first segment regions. The second segment regions 81 are controlled according to the transmittance thus determined. As a result, the luminance distribution of the light passing through the dimming panel 80 appears as a monochromatic image having luminance distribution similar to that of the display output of FIG. 10, as illustrated, for example, in FIG. 12.

The first corrector 105 performs the processing described above for each of the second segment regions 81. In the processing, the first corrector 105 determines the transmittance of light through one of the second segment regions 81 based on the luminance of the first segment region overlapping the second segment region 81 and the highest gradation value of the gradation values represented by the input signals for two or more pixels 48 overlapping the second segment region 81, and corrects the quantity of the light passing through the second segment region 81.

The second corrector 106 multiplies the gradation values represented by the input signals IP (such as the gradation values represented by the input signals IP after being subjected to the gamma conversion) corresponding to the pixels 48 by a gain based on at least the reciprocal of the transmittance of light through the second segment region 81. Specifically, the second corrector 106 multiplies the gradation values represented by the input signals IP corresponding to the pixels 48 by the reciprocal of the ratio of the luminance of the first segment region and the reciprocal of the transmittance of the second segment region 81 overlapping the pixels 48.

For example, assume a case where the luminance of the first segment region illustrated in FIG. 8 is 100 [%], and the transmittance of one of the second segment regions 81 overlapping the first segment region is 100 [%]. In this case, the second corrector 106 directly employs the gradation values of the input signals IP (input signals IP after being subjected to the gamma conversion) corresponding to the pixels 48 (such as the 16 pixels 48 included in the coordinates (xa,ya) in FIG. 8) overlapping the second segment region 81. This is because, in this case, the luminance of the first segment region is 100 [%], and hence, the ratio of the luminance of the first segment region to the maximum luminance (100 [%]) of the first segment regions is 1. In addition, in this case, the transmittance of the second segment region 81 is 100 [%], and hence, the reciprocal of the transmittance is 1. Accordingly, the first corrector 105 multiplies the gradation values represented by the input signals IP corresponding to the pixels 48 overlapping the second segment region 81 by 1 and 1. As a result, the gradation values represented by the input signals IP corresponding to the pixels 48 do not change. In this case, the second corrector 106 may multiply the gradation values represented by the input signals IP by 1 and 1, or may skip the multiplication processing.

Assume also a case where the gradation values are 8-bit values, the luminance of the first segment region illustrated in FIG. 8 is 100 [%], and the transmittance of one of the second segment regions 81 overlapping the first segment region is 50 [%]. This case is a case where the second identification processing has identified that the highest gradation value of the gradation values represented by the input signals IP is 50 [%] of the maximum value representable by 8 bits (such as 127). In this case, the second corrector 106 multiplies the gradation values represented by the input signals IP corresponding to the pixels 48 overlapping the second segment region 81 by the reciprocal (2) of the transmittance of the second segment region 81. For example, when the gradation values are 8-bit values, and gradation values represented by the input signals IP corresponding to one of the pixels 48 are (R,G,B)=(0,50,100), the second corrector 106 corrects the gradation values to (R,G,B)=(0, 100,200).

Assume also a case where the gradation values are 8-bit values, the luminance of the first segment region illustrated in FIG. 8 is 50 [%], and the transmittance of one of the second segment regions 81 overlapping the first segment region is 50 [%]. This case is a case where the first identification processing has identified that the highest gradation value of the gradation values represented by the input signals IP is 50 [%] of the maximum value representable by 8 bits (such as 127). This case is also a case where the second identification processing has identified that the highest gradation value of the gradation values represented by the input signals IP is 25 [%] of the maximum value representable by 8 bits (such as 63). In this case, the second corrector 106 multiplies the gradation values represented by the input signals IP corresponding to the pixels 48 overlapping the second segment region 81 by the reciprocal (2) of the ratio of the luminance of the first segment region and the reciprocal (2) of the transmittance of the second segment region 81. For example, when the gradation values are 8-bit values, and gradation values represented by the input signals IP corresponding to one of the pixels 48 are (R,G,B)=(0,10,20), the second corrector 106 corrects the gradation values to (R,G,B)=(0,40,80).

When the luminance of the first segment region illustrated in FIG. 8 is 0 [%], the gradation values represented by the input signals IP corresponding to the pixels 48 overlapping the first segment region are 0. Accordingly, in this case, the second corrector 106 skips the multiplication processing on the gradation values represented by the input signals IP, or, if not skipping the multiplication processing, keeps the gradation values at 0.

The above description has exemplified the correction of the gradation values represented by the input signals IP corresponding to the pixels 48 overlapping one of the second segment regions 81. The second corrector 106 also performs the same processing on the gradation values represented by the input signals IP corresponding to the pixels 48 overlapping the other second segment regions 81 (such as the second segment regions 81 at coordinates other than the coordinates (xa,ya) in FIG. 8). The second corrector 106 performs the correction of the gradation values represented by the input signals IP not only on the pixels 48 overlapping the second regions 81 overlapping one of the first segment regions, but also, in the same manner, on the pixels 48 overlapping the second regions 81 overlapping the first segment regions.

The second corrector 106 performs the processing described above for each of the pixels 48. In the processing, the second corrector 106 multiplies the gradation values of the pixel 48 overlapping the second segment region 81 by the gain obtained by using a first reciprocal and a second reciprocal as multipliers, the first reciprocal being the reciprocal of the ratio of the luminance of one of the first segment regions determined by the determination processor to the maximum luminance of the first segment regions, and the second reciprocal being the reciprocal of the transmittance of light through the second segment region 81. Hereinafter, the gradation values of the input signals IP corresponding to the pixels 48 after being subjected to the processing by the second corrector 106 is referred to as the "corrected gradation values", in some cases.

The reverse gamma converter 107 performs reverse gamma conversion on the transmittances of the second segment regions 81 determined by the first corrector 105 and on the corrected gradation values. The first buffer 108 is a buffer memory that holds the transmittance of the second segment regions 81 after being subjected to the reverse gamma conversion. The second buffer 109 is a buffer memory that holds the corrected gradation values after being subjected to the reverse gamma conversion.

Each time the first buffer 108 stores therein transmittances of a predetermined number of the second segment regions 81, the signal processor 10 outputs signals representing these transmittances as signals indicating the transmittance of the dimming area DA to the dimming panel driver 90. Specifically, each time the first buffer 108 stores therein transmittances of the second segment regions 81 for, for example, first predetermined number of lines (one row or a plurality of rows), the signal processor 10 outputs signals representing these transmittances as signals indicating the transmittance of the dimming area DA to the dimming panel driver 90.

Each time the second buffer 109 stores therein the corrected gradation values corresponding to a predetermined number of the pixels 48, the signal processor 10 outputs signals representing these gradation values as the output signals OP to the image display panel driver 40. Specifically, each time the second buffer 109 stores therein the corrected gradation values corresponding to the pixels 48 for, for example, a second predetermined number of lines (one row or a plurality of rows), the signal processor 10 outputs signals representing these gradation values as the output signals OP to the image display panel driver 40.

As described above, the signal processor 10 individually determines the luminance of each of the first segment regions, the transmittance of each of the second segment regions 81 overlapping the first segment region, and the gradation values of the pixels 48 overlapping the second segment region 81. In this embodiment, the first segment regions are provided as regions that emit light by guiding the light of the light sources 51 using the individual light guide plates 52. Therefore, the luminance of the first segment regions can be individually controlled as independent from one another. Accordingly, the determination of the transmittances of the second segment regions 81 can easily be completed on a first segment region basis, and thus, the relation between the light from the light source device 50 and the transmittances of the second segment regions 81 can be simplified. As a result, the processing load for the determination of the transmittances of the second segment regions 81 can be reduced. In addition, the correction of the gradation values of the input signals IP corresponding to the pixels 48 can easily be completed on a second segment region 81 basis, and thus, the relation between the transmittances and the gradation values of the second segment regions 81 can be simplified. As a result, the processing load for the correction of the gradation values can be reduced.

When the signal processor 10 outputs signals indicating the transmittance of the dimming area DA in units of the first predetermined number of lines and outputs the output signals OP in units of the second predetermined number of lines, the signal processor 10 may perform "backlight scanning" at timings corresponding to the output timing of the signals indicating the transmittance of the dimming area DA and the output signals OP. In the backlight scanning, the signal processor 10 controls the lighting of the light sources 51 so as to temporarily preventing the light from being emitted from the first segment regions overlapping the second segment regions 81 in the dimming area DA to be updated in transmittance and the pixels 48 to which the output signals OP are to be output. In this case, the lighting amount determination processor 103 outputs the light source drive signals BL so as to set the lighting amounts of the light sources 51 for the first segment regions to 0 [%] in synchronization with the output timing.

Figure 13:
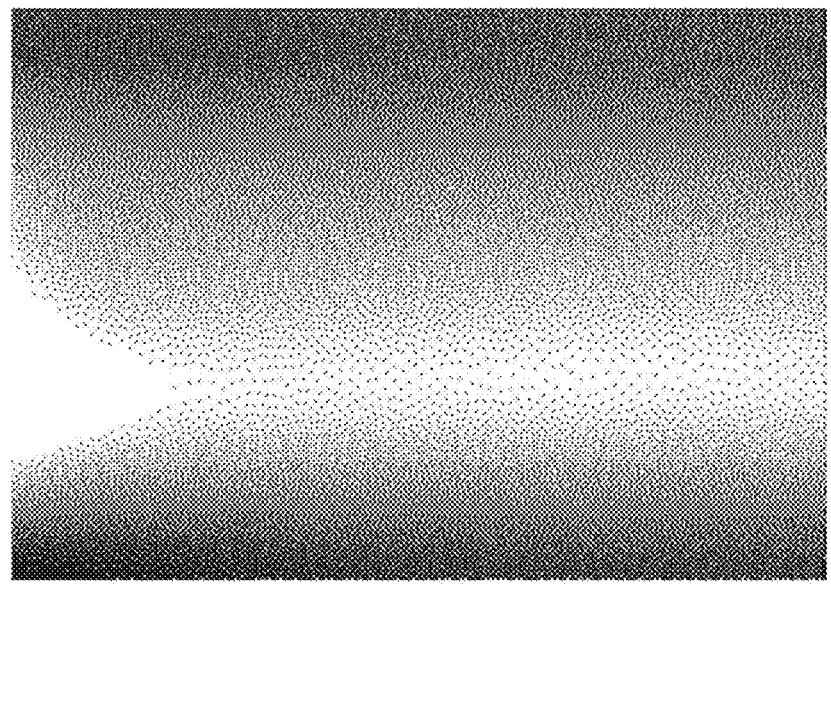
FIG. 13 is a diagram illustrating an example of luminance of light emitted from a light source device of a comparative example different from that of the embodiment.
Figure 14:
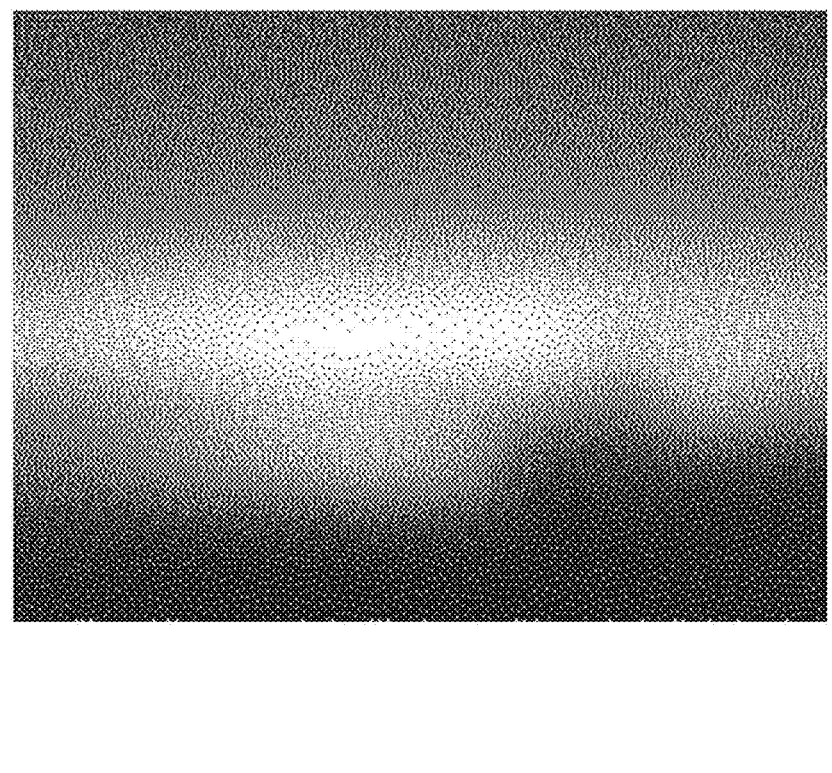
FIG. 14 is a diagram illustrating another example of the luminance of the light emitted from the light source device of the comparative example different from that of the embodiment.

FIGS. 13 and 14 are diagrams illustrating examples of the luminance of light emitted from a light source device of a comparative example different from that of this embodiment. When the light source device has a light guide plate not divided in the display area OA, the light guided by the light guide plate produces a gradation across the entire light guide plate, as illustrated in FIGS. 13 and 14. On the assumption of use of such a light source device, processing, such as the correction of the gradation values, needs to be performed taking into account the influence of the light over the entire light guide plate. Therefore, in the comparative example, the processing load for, for example, the correction of the gradation values is higher. In contrast, the display device 1 of this embodiment can reduce the processing load, as described above.

Figure 15:
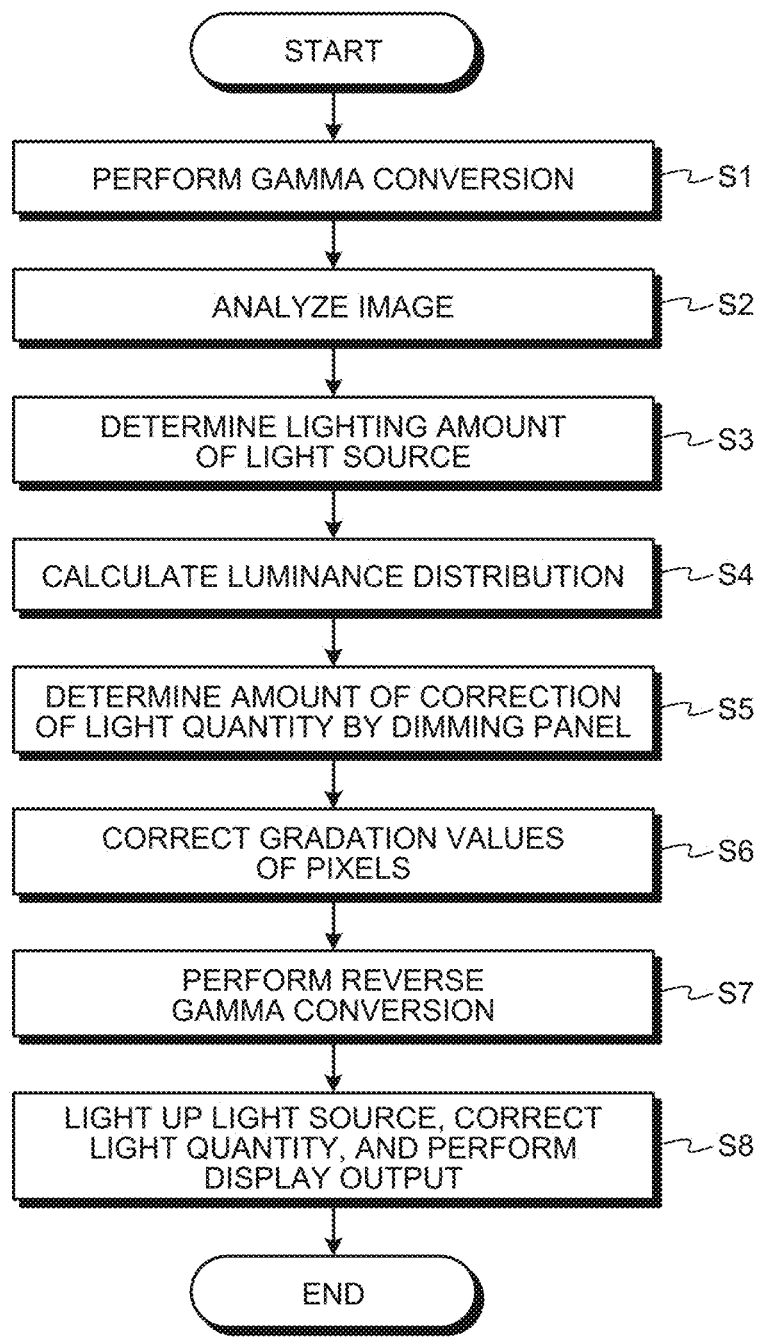
FIG. 15 is a flowchart of an exemplary processing by the signal processor.

FIG. 15 is a flowchart of an exemplary processing by the signal processor 10. First, the gamma converter 101 performs the gamma conversion on the input signals IP (Step S1). Then, the image analyzer 102 analyzes the image data represented by the input signals IP after being subjected to the gamma conversion (Step S2). Then, the lighting amount determination processor 103 determines the lighting amount of the light source 51 corresponding to the luminance required for each of the first segment regions (Step S3). The luminance distribution calculator 104 obtains the luminance distribution of the image data represented by the input signals IP after being subjected to the gamma conversion (Step S4). Then, the first corrector 105 determines the transmittance of the second segment regions 81 to determine the amount of correction of the light quantity by the dimming panel 80 (Step S5). The second corrector 106 corrects the gradation values represented by the input signals IP after being subjected to the gamma conversion (Step S6). The reverse gamma converter 107 performs the reverse gamma conversion on the transmittance of the second segment regions 81 determined by the first corrector 105 and the corrected gradation values (Step S7). Then, the output of the light source drive signals BL, the output of the signals indicating the transmittance of the dimming area DA, and the output of the output signals OP are performed (Step S8).

Figure 16:
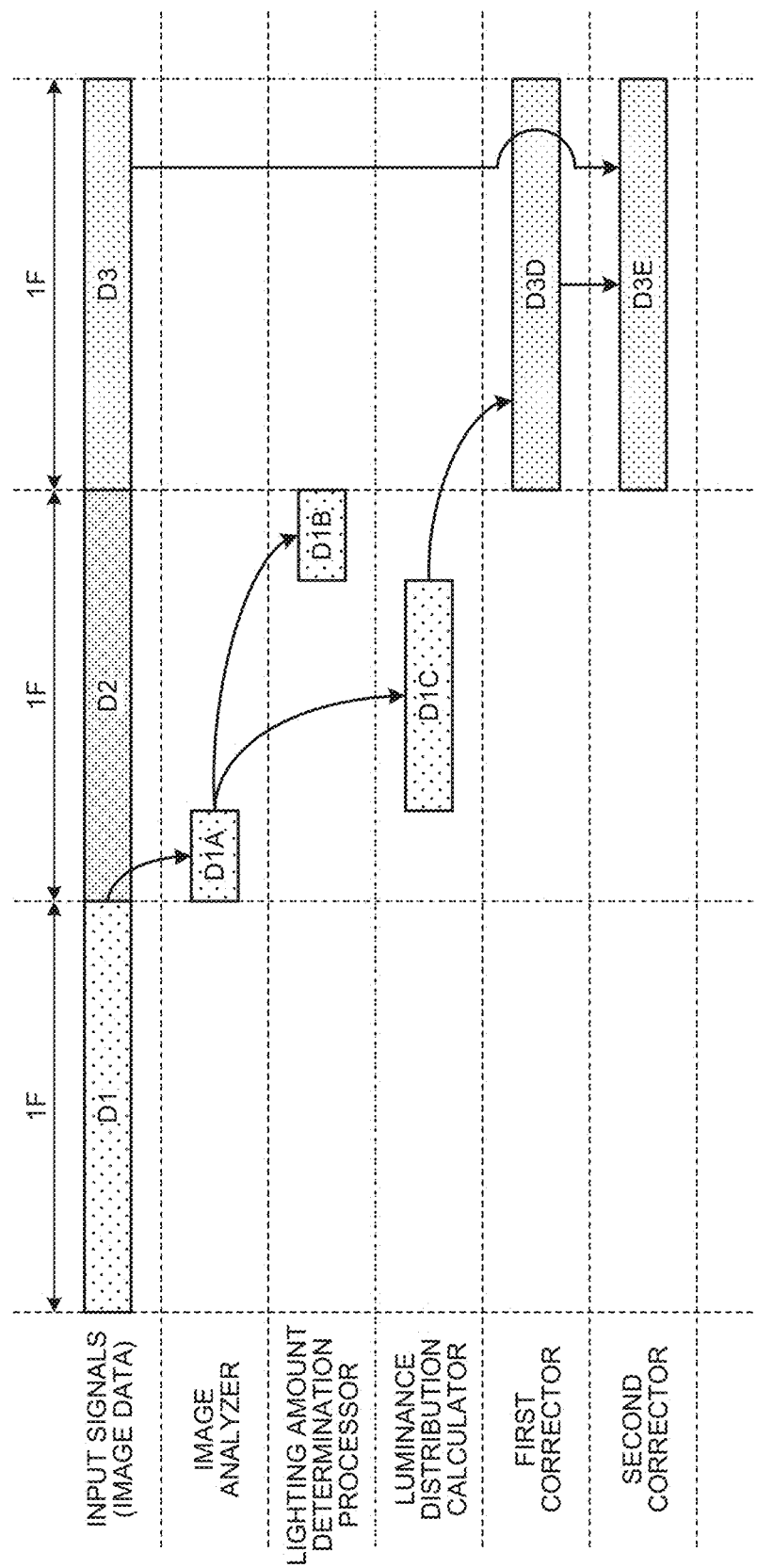
FIG. 16 is a timing chart illustrating an example of timings of various types of processing by the signal processor.

FIG. 16 is a timing chart illustrating an example of timings of various types of processing by the signal processor 10. FIG. 16 illustrates relations between each piece of image data D1, D2, and D3 represented by input signals received by the signal processor 10 in a predetermined one frame (1F) period and various processing periods D1A, D1B, D1C, D3D, and D3E. For example, after the first image data D1 is fully received, the processing is performed by the image analyzer 102, the lighting amount determination processor 103, and the luminance distribution calculator 104 during the 1F period in which the second image data D2 is received. Specifically, the processing period D1B of the lighting amount determination processor 103 and the processing period D1C of the luminance distribution calculator 104 are periods after the processing period D1A of the image analyzer 102. In FIG. 16, the processing period D1B of the lighting amount determination processor 103 is a period after the processing period D1C of the luminance distribution calculator 104 in order to synchronize the output time of the result of processing by the lighting amount determination processor 103 with the start time of the 1F period in which the third image data D3 is received.

The 1F period in which the third image data D3 is received includes the processing period D3D and the processing period D3E. The processing period D3D is a period in which the first corrector 105 performs the processing based on the result of the processing performed by the luminance distribution calculator 104 during the processing period D1C. The processing period D3E is a period in which the second corrector 106 performs the processing based on the result of the processing by the first corrector 105 and the input signals IP constituting the third image data D3. In other words, in the example illustrated in FIG. 16, the gradation values represented by the input signals IP constituting the third image data D3 are corrected under the condition that the light from the first segment regions based on the first image data D1 is corrected by the control of the transmittance of the second segment regions 81 based on the luminance distribution of the first image data D1. With this configuration, the signal processor 10 need not keep holding the image data (such as the first image data D1 and/or the second image data D2) already fully received. Therefore, a buffer memory for holding the image data can be smaller. Once the transmittance of one of the second segment regions 81 is determined, the gradation values of the pixels 48 overlapping the second segment region 81 is ready to be corrected. Therefore, the determination of the transmittance of the second segment region 81 can be performed in parallel with the correction of the gradation values of the pixels 48 overlapping the second segment region 81 already determined in transmittance. The signal processor 10 may include a buffer memory for holding the image data already fully received, and may adjust the light from the first segment regions and the transmittance of the second segment regions 81 and correct the gradation values, based on the input signals IP constituting the same image data.

As described above, the display device 1 of this embodiment can individually control the luminance of each of the first segment regions so as to cause the luminance to correspond to the gradation values of the pixels 48 for the first segment region. As a result, the first segment regions to be illuminated at luminance required for display output of the entire image are restrained from being produced, and thus, the power consumption can be reduced. In a position where the pixels 48 having relatively low gradation values are arranged continuously, more specifically, in a position, for example, where the pixels 48 of black are arranged continuously across an area covering one of the first segment regions, the background of the black pixels 48 can easily be made darker by not lighting up the light source 51 to prevent the first segment region from emitting light, and in addition, by reducing the transmittance of the second segment regions 81. As a result, the gradation difference between bright and dark areas increases. Accordingly, a higher contrast can be obtained.

The gain to be multiplied by the gradation values according to the quantity of light emitted to the pixels 48 is determined based on, for example, the reciprocal of the transmittance of light passing through the second segment region 81 overlapping the pixels 48. This configuration enables completion of the processing to correct the gradation values in units of the second segment regions 81. As a result, the processing can be made significantly simpler than correction of the gradation values based on the luminance distribution of light emitted to the entire display area OA. Accordingly, the processing load of the signal processor 10 can be reduced.

The processing to determine the luminance of one of the first segment regions is performed for each of the first segment regions based on the highest gradation value among the gradation values represented by the input signals for four or more pixels 48 overlapping the first segment region. With this configuration, the luminance of each of the first segment regions can be set to luminance required for the pixels 48 overlapping the first segment region. As a result, the light source 51 only needs to be lit up according to the required luminance. Accordingly, the light source 51 need not be lit up more than necessary, and wasteful power consumption can be reduced.

Each of the first segment regions is provided with the light source 51. With this configuration, the luminance of each of the first segment regions can be individually controlled by individually controlling the lighting amount of the corresponding light source 51.

The light sources 51 are arranged in a side-lit configuration, thus being easier to make the display device thinner.

Modifications

Figure 17:
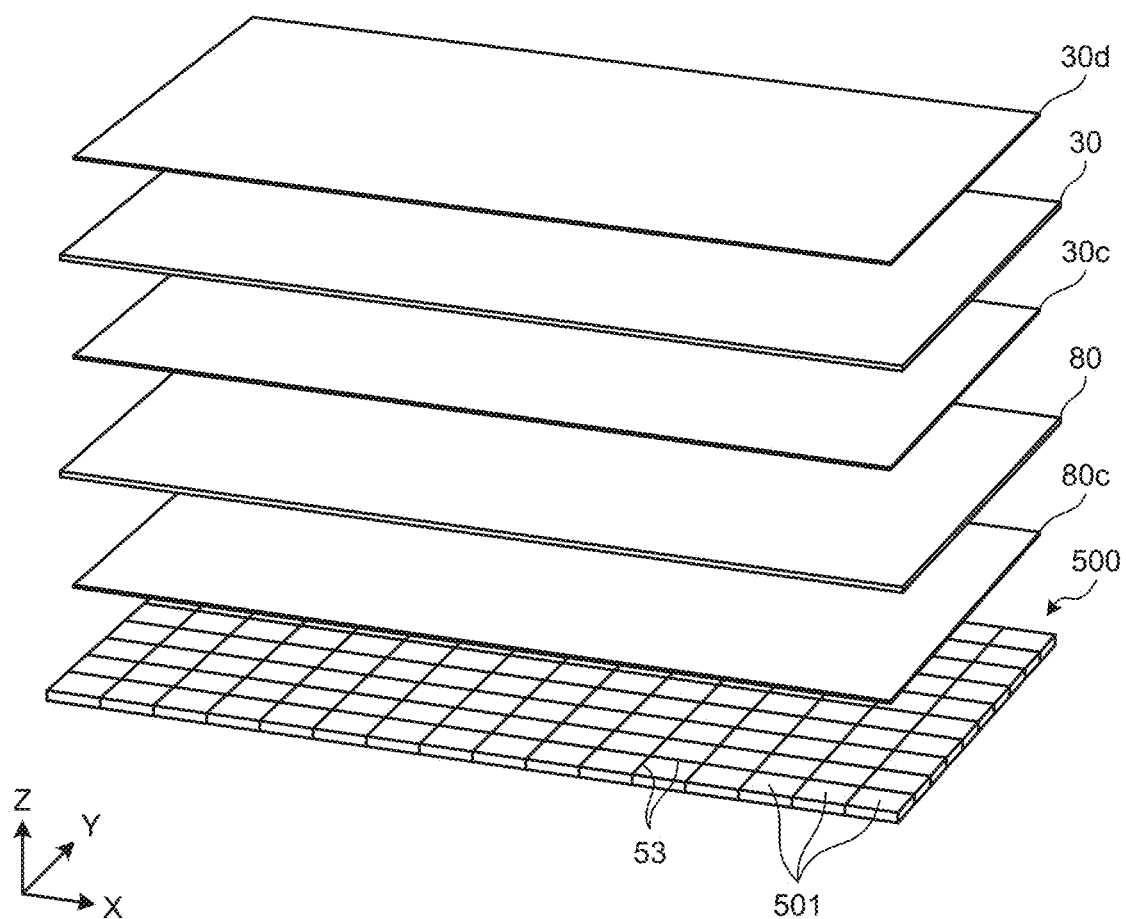
FIG. 17 is a diagram illustrating a modification of the embodiment in which a light source device different from the light source device illustrated in FIG. 3 is provided.

FIG. 17 is a diagram illustrating a modification of this embodiment in which a light source device 500 different from the light source device 50 illustrated in FIG. 3 is provided. In the modification illustrated in FIG. 17, the light source device 500 is provided instead of the light source device 50 included in the display device according to the embodiment described above. In the light source device 500, the light source 51 is individually provided on a back surface side of each of a plurality of light guide plates 501 arranged in a matrix (in a row-column configuration). A display device according to the modification is the same as the display device in the embodiment described above except for the difference between the light source device 500 and the light source device 50.

FIG. 18 is a diagram illustrating a luminance distribution example of light emitted from the light source device 500 illustrated in FIG. 17. FIG. 19 is a diagram illustrating an exemplary state of the dimming area DA irradiated with light providing the luminance distribution illustrated in FIG. 18. Providing the light sources 51 on the back surface sides of the light guide plates 501 makes it easier to increase two-dimensional numbers (such as the number in the X-direction and the number the Y-direction) of the first segment regions provided in the illumination area LA. As a result, as illustrated in, for example, FIG. 18, the luminance of the illumination area LA is more easily matched with the display output (refer, for example, to FIG. 10). Also in the determination of the transmittance of the dimming panel 80, the transmittance is more easily matched with the display output, as illustrated in FIG. 19.

Figure 20:
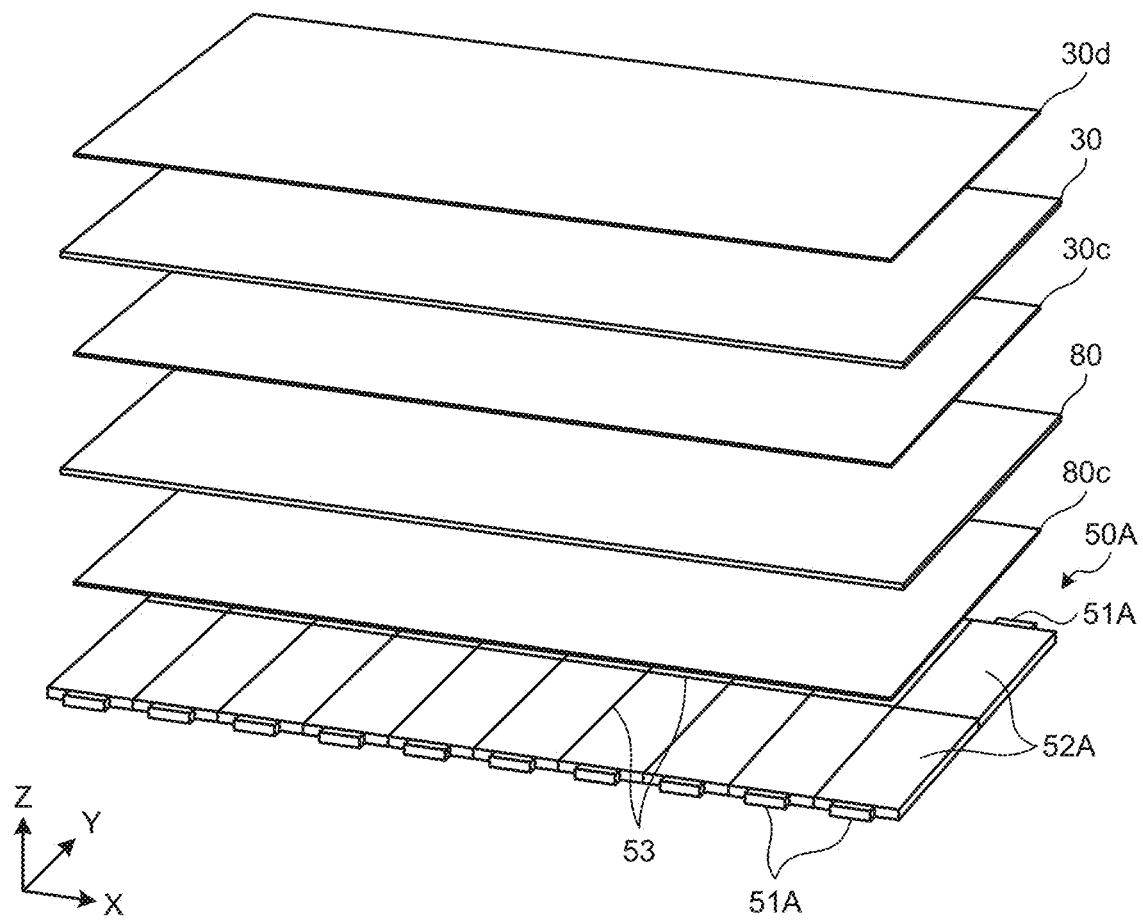
FIG. 20 is a diagram illustrating another modification of the embodiment in which a light source device different from the light source devices illustrated in FIGS. 3 and 17 is provided.

FIG. 20 is a diagram illustrating another modification of the embodiment in which a light source device 50A different from the light source device 50 illustrated in FIGS. 3 and 17 is provided. In the modification illustrated in FIG. 20, the light source device 50A is provided instead of the light source device 50 included in the display device according to the embodiment described above. The light source device 50A includes a plurality of light sources 51A and a plurality of light guide plates 52A. The light sources 51A are arranged along both sides extending in the X-direction. The light guide plates 52A are arranged such that the number of the light guide plates 52A in X-direction is 10, the number thereof in Y-direction is 2, and the total number thereof is 20 obtained by 10×2. The light source device 50A is the same as the light source device 50 except that the arrangement of the light sources 51A and the light guide plates 52A differs from that of the light sources 51 and the light guide plates 52 in the embodiment described above.

In the embodiment and the modifications thereof (embodiment and the like) described above, the dimming panel 80 is provided between the image display panel 30 and the light source device (such as any one of the light source devices 50, 500, and 50A). This configuration is merely an example of the positional relation of the image display panel 30, the dimming panel 80, and the light source device. The positional relation is not limited thereto. The positions of the image display panel 30 and the dimming panel 80 may be reversed. In other words, the light source device serving as an illuminator has one surface side and the other surface side (display surface side), and the dimming panel 80 only needs to be provided on the other surface side of the light source device, and to be configured to be adjusted in the transmittance of the light emitted to the other surface side of the image display panel 30 through the display area OA.

The specific numerical values in the description of the embodiment, such as the number of bits of the gradation values in the embodiment and the like described above, are merely examples, and are not limited thereto and can be changed as appropriate.

Other operational effects accruing from the aspects described in the embodiment and the like that are obvious from the description herein, or that are appropriately conceivable by those skilled in the art will naturally be understood as accruing from the present invention.

What is claimed is:

1. A display device comprising:
a display panel including a display area provided with a plurality of pixels;
an illuminator including an illumination area configured to emit light to the display panel such that the display area is illuminated from one surface side of the display panel;
a liquid crystal dimming panel overlapping the display panel, and including a dimming area configured to be adjusted in transmittance of the light emitted to another surface side of the display panel through the display area, and
a signal processor, wherein
the illumination area includes a plurality of first segment regions configured such that luminance levels thereof are individually adjusted,
the dimming area includes a plurality of second segment regions configured such that the light transmittances thereof are individually adjusted,
each of the first segment regions overlaps more than one of the second segment regions,
each of the second segment regions overlaps more than one of the pixels, and
the signal processor is configured
to determine the light transmittance of the second segment region overlapping the pixels based on the luminance of the first segment region and gradation values represented by input signals for driving the pixels, and
to multiply the gradation values by a gain based on the reciprocal of the light transmittance of the second segment region.

2. The display device according to claim 1, wherein the signal processor comprises:
a first identification processor configured to identify the highest gradation value of the gradation values represented by the input signals for four or more pixels overlapping one of the first segment regions;

a second identification processor configured to identify the highest gradation value of the gradation values represented by the input signals for two or more pixels overlapping one the second segment regions;

a determination processor configured to perform processing, for each of the first segment regions, to determine the luminance of the first segment region based on the highest gradation value of the gradation values represented by the input signals for four or more pixels overlapping the first segment region;

a first corrector configured to perform processing, for each of the second segment regions, to determine the transmittance of the light passing through the second segment region based on the luminance of the first segment region overlapping the second segment region and the highest gradation value of the gradation values represented by the input signals for two or more of the pixels overlapping the second segment region, and to correct the quantity of the light passing through the second segment region; and a second corrector configured to perform processing, for each of the pixels, to multiply the gradation values of the pixel overlapping the second segment region by a gain obtained by using a first reciprocal and a second reciprocal as multipliers, the first reciprocal being a reciprocal of a ratio of the luminance of one of the first segment regions determined by the determination processor to the maximum luminance of the first segment regions, and the second reciprocal being a reciprocal of the transmittance of the light through the second segment region.

3. The display device according to claim 1, wherein
each of the first segment regions is provided with a light source, and
a lighting amount of the light source for each of the different first segment regions is individually determined.

4. The display device according to claim 3, wherein the light source is provided on a lateral side of a light guide plate configured to guide the light to the first segment region.

5. The display device according to claim 3, wherein the light source is provided on a back surface side of a light guide plate configured to guide the light to the first segment region.

* * * * *